(12) United States Patent
Hawley et al.

(10) Patent No.: US 7,637,430 B2
(45) Date of Patent: Dec. 29, 2009

(54) PICTURE TAKING OPTICAL READER

(75) Inventors: Thomas Hawley, Skaneateles, NY (US);
Michael A. Ehrhart, Liverpool, NY
(US); Timothy P. Meier, Camillus, NY
(US); Andrew Longacre, Jr.,
Skaneateles, NY (US); **Robert M.
Hussey**, Camillus, NY (US)

(73) Assignee: Hand Held Products, Inc., Skaneateles
Falls, NY (US)

( * ) Notice: Subject to any disclaimer, the term of this
patent is extended or adjusted under 35
U.S.C. 154(b) by 264 days.

(21) Appl. No.: 10/842,851

(22) Filed: May 11, 2004

(65) Prior Publication Data

US 2005/0001035 A1 Jan. 6, 2005

Related U.S. Application Data

(60) Provisional application No. 60/470,016, filed on May 12, 2003.

(51) Int. Cl.
*G06K 7/10* (2006.01)
*G06K 7/14* (2006.01)

(52) U.S. Cl. .................. 235/454; 235/462.18

(58) Field of Classification Search ........... 235/462.06, 235/462.2, 462.21, 462.32, 462.33, 462.42, 235/375, 380, 437, 449, 454, 493, 494, 462.18; 381/112, 137, 139, 140; 705/44, 45, 67, 705/75
See application file for complete search history.

(56) References Cited

U.S. PATENT DOCUMENTS

| | | | |
|---|---|---|---|
| 3,801,775 A | 4/1974 | Acker | |
| 3,902,047 A | 8/1975 | Tyler et al. | |
| 4,020,463 A | 4/1977 | Himmel | |
| 4,286,255 A | 8/1981 | Siy | |
| 4,335,303 A | 6/1982 | Call | |
| 4,387,298 A | 6/1983 | Petersen et al. | |
| 4,499,372 A | 2/1985 | Nakano | |
| 4,530,584 A | 7/1985 | Schmidt | |
| 4,544,064 A | 10/1985 | Felder | |
| 4,562,592 A | 12/1985 | Chainer et al. | |
| 4,581,762 A | 4/1986 | Lapidus et al. | |

(Continued)

FOREIGN PATENT DOCUMENTS

| | | |
|---|---|---|
| EP | 0350933 A2 | 1/1990 |
| EP | 0392159 A2 | 10/1990 |
| EP | 0439682 A2 | 8/1991 |
| EP | 0733991 A2 | 9/1996 |
| EP | 0910032 A2 | 4/1999 |

(Continued)

OTHER PUBLICATIONS

U.S. Appl. No. 09/385,597, filed Aug. 30, 1999, Parker et al.

(Continued)

*Primary Examiner*—Kumiko C Koyama
(74) *Attorney, Agent, or Firm*—Marjama Muldoon Blasiak & Sullivan, LLP

(57) ABSTRACT

An optical reader having a picture taking mode and a decode mode. In a picture taking mode, the reader captures and outputs a frame of image data without attempting to decode a decodable symbol in the frame. In the decode mode, the reader captures a frame of image data and attempts to decode a decodable symbol represented in the frame. The reader may have a decode mode in which light from an aiming light source is received by an image sensor.

16 Claims, 15 Drawing Sheets

U.S. PATENT DOCUMENTS

| | | |
|---|---|---|
| 4,588,211 A | 5/1986 | Greene |
| 4,656,591 A | 4/1987 | Goldberg |
| 4,760,248 A | 7/1988 | Swartz et al. |
| 4,776,464 A | 10/1988 | Miller et al. |
| 4,794,239 A | 12/1988 | Allais |
| 4,832,204 A | 5/1989 | Handy et al. |
| 4,835,372 A | 5/1989 | Gombrich et al. |
| 4,855,842 A | 8/1989 | Hayes et al. |
| 4,858,000 A | 8/1989 | Lu |
| 4,868,757 A | 9/1989 | Gil |
| 4,873,426 A | 10/1989 | Sarna et al. |
| 4,877,948 A | 10/1989 | Krueger |
| 4,877,949 A | 10/1989 | Danielson et al. |
| 4,924,078 A | 5/1990 | Sant Anselmo et al. |
| 4,948,955 A | 8/1990 | Lee et al. |
| 4,972,494 A | 11/1990 | White et al. |
| 5,010,241 A | 4/1991 | Butterworth |
| 5,019,699 A | 5/1991 | Koenck |
| 5,038,391 A | 8/1991 | Yamaguchi |
| 5,039,847 A | 8/1991 | Morii et al. |
| 5,043,908 A | 8/1991 | Manduley et al. |
| 5,050,223 A | 9/1991 | Sumi |
| 5,054,102 A | 10/1991 | Gaborski |
| 5,102,110 A | 4/1992 | Reynolds |
| 5,103,489 A | 4/1992 | Miette |
| 5,119,433 A | 6/1992 | Will |
| 5,120,940 A | 6/1992 | Willsie |
| 5,134,669 A | 7/1992 | Koegh et al. |
| 5,138,140 A | 8/1992 | Siemiatkowski et al. |
| 5,138,141 A | 8/1992 | Blanford et al. |
| 5,199,081 A | 3/1993 | Saito et al. |
| 5,199,084 A | 3/1993 | Kishi et al. |
| 5,212,777 A | 5/1993 | Gove et al. |
| 5,237,625 A | 8/1993 | Yamashita et al. |
| 5,243,655 A | 9/1993 | Wang |
| 5,262,623 A | 11/1993 | Batterman et al. |
| 5,262,871 A | 11/1993 | Wilder et al. |
| 5,278,399 A | 1/1994 | Sano |
| 5,291,243 A | 3/1994 | Heckman et al. |
| 5,296,689 A | 3/1994 | Redderson et al. |
| 5,296,690 A | 3/1994 | Chandler et al. |
| 5,296,960 A | 3/1994 | Ellingson et al. |
| 5,299,116 A | 3/1994 | Owens et al. |
| 5,301,243 A | 4/1994 | Olschafskie et al. |
| 5,304,423 A | 4/1994 | Niknafs et al. |
| 5,304,786 A | 4/1994 | Pavlidis et al. |
| 5,307,423 A | 4/1994 | Gupta et al. |
| 5,313,051 A | 5/1994 | Brigida et al. |
| 5,317,388 A | 5/1994 | Surka et al. |
| 5,331,151 A | 7/1994 | Cochran et al. |
| 5,331,176 A | 7/1994 | Sant Anselmo |
| 5,337,361 A | 8/1994 | Wang et al. |
| 5,354,977 A | 10/1994 | Roustaei |
| 5,365,048 A | 11/1994 | Komiya et al. |
| 5,375,226 A | 12/1994 | Sano et al. |
| 5,378,883 A | 1/1995 | Batterman et al. |
| 5,392,447 A | 2/1995 | Schlack et al. |
| 5,396,054 A | 3/1995 | Krichever et al. |
| 5,399,846 A | 3/1995 | Pavlidis et al. |
| 5,410,141 A | 4/1995 | Koenck et al. |
| 5,413,383 A | 5/1995 | Laurash et al. |
| 5,414,251 A | 5/1995 | Durbin |
| 5,420,403 A | 5/1995 | Allum et al. |
| 5,420,943 A | 5/1995 | Mak |
| 5,421,778 A | 6/1995 | Kouramanis |
| 5,422,470 A | 6/1995 | Kubo |
| 5,428,211 A | 6/1995 | Zheng et al. |
| 5,428,212 A | 6/1995 | Tani et al. |
| 5,446,271 A | 8/1995 | Cherry et al. |
| 5,448,375 A | 9/1995 | Cooper et al. |
| 5,449,201 A | 9/1995 | Miller et al. |
| 5,467,411 A | 11/1995 | Tanaka et al. |
| 5,471,533 A | 11/1995 | Wang et al. |
| 5,489,158 A | 2/1996 | Wang et al. |
| 5,489,769 A | 2/1996 | Kubo |
| 5,504,322 A | 4/1996 | Pavlidis et al. |
| 5,504,367 A | 4/1996 | Arackellian et al. |
| 5,506,697 A | 4/1996 | Li et al. |
| 5,508,818 A | 4/1996 | Hamma |
| 5,512,739 A | 4/1996 | Chandler et al. |
| 5,513,017 A | 4/1996 | Knodt et al. |
| 5,513,264 A | 4/1996 | Wang et al. |
| 5,521,366 A | 5/1996 | Wang et al. |
| 5,550,364 A | 8/1996 | Rudeen |
| 5,550,366 A | 8/1996 | Roustaei |
| 5,557,091 A | 9/1996 | Krummel |
| 5,557,519 A | 9/1996 | Morita et al. |
| 5,570,135 A | 10/1996 | Gove et al. |
| 5,574,519 A | 11/1996 | Manico et al. |
| 5,581,636 A | 12/1996 | Skinger |
| 5,585,616 A * | 12/1996 | Roxby et al. ............ 235/462.06 |
| 5,591,955 A | 1/1997 | Laser |
| 5,591,956 A | 1/1997 | Longacre, Jr. et al. |
| 5,598,007 A | 1/1997 | Bunce et al. |
| 5,602,382 A | 2/1997 | Ulvr et al. |
| 5,607,187 A | 3/1997 | Salive et al. |
| 5,617,481 A | 4/1997 | Nakamura |
| 5,627,915 A | 5/1997 | Rosser et al. |
| 5,635,694 A | 6/1997 | Tuhro |
| 5,635,697 A | 6/1997 | Shellhammer et al. |
| 5,642,442 A | 6/1997 | Morton et al. |
| 5,644,408 A | 7/1997 | Li et al. |
| 5,646,390 A | 7/1997 | Wang et al. |
| 5,659,167 A | 8/1997 | Wang et al. |
| 5,684,290 A | 11/1997 | Arackellian et al. |
| 5,691,527 A | 11/1997 | Hara et al. |
| 5,697,504 A | 12/1997 | Hiramatsu et al. |
| 5,702,059 A | 12/1997 | Chu et al. |
| 5,703,349 A | 12/1997 | Meyerson et al. |
| 5,710,417 A | 1/1998 | Joseph et al. |
| 5,710,419 A | 1/1998 | Wang et al. |
| 5,723,868 A | 3/1998 | Hammond, Jr. et al. |
| 5,726,981 A | 3/1998 | Ylitervo et al. |
| 5,734,153 A | 3/1998 | Swartz et al. |
| 5,756,981 A | 5/1998 | Roustaei et al. |
| 5,760,382 A | 6/1998 | Li et al. |
| 5,761,686 A | 6/1998 | Bloomberg |
| 5,770,841 A | 6/1998 | Moed et al. |
| 5,773,806 A | 6/1998 | Longacre, Jr. |
| 5,773,810 A | 6/1998 | Hussey et al. |
| 5,780,834 A | 7/1998 | Havens et al. |
| 5,783,811 A | 7/1998 | Feng et al. |
| 5,786,586 A | 7/1998 | Pidhirny et al. |
| 5,793,033 A | 8/1998 | Feng et al. |
| 5,796,090 A | 8/1998 | Pavlidis et al. |
| 5,801,371 A | 9/1998 | Kahn et al. |
| 5,818,028 A | 10/1998 | Meyerson et al. |
| 5,818,528 A | 10/1998 | Roth et al. |
| 5,821,518 A | 10/1998 | Sussmeier et al. |
| 5,821,523 A | 10/1998 | Bunte et al. |
| 5,834,754 A | 11/1998 | Feng et al. |
| 5,837,986 A | 11/1998 | Barile et al. |
| 5,841,121 A | 11/1998 | Koenck |
| 5,857,029 A | 1/1999 | Patel |
| 5,867,595 A | 2/1999 | Cymbalski |
| 5,880,453 A | 3/1999 | Wang et al. |
| 5,886,338 A | 3/1999 | Arackellian et al. |
| 5,892,824 A | 4/1999 | Beatson et al. |
| 5,914,476 A | 6/1999 | Gerst, III et al. |
| 5,917,925 A | 6/1999 | Moore |
| 5,917,945 A | 6/1999 | Cymbalski |
| 5,920,056 A | 7/1999 | Bonnet |
| 5,929,418 A | 7/1999 | Ehrhart et al. |
| 5,945,661 A | 8/1999 | Nukui et al. |

| | | |
|---|---|---|
| 5,949,052 A | 9/1999 | Longacre, Jr. et al. |
| 5,949,053 A | 9/1999 | Zlotnick |
| 5,949,057 A | 9/1999 | Feng |
| 5,965,863 A | 10/1999 | Parker et al. |
| 5,974,202 A | 10/1999 | Wang et al. |
| 5,992,753 A | 11/1999 | Xu |
| 6,000,612 A | 12/1999 | Xu |
| 6,002,491 A | 12/1999 | Li et al. |
| 6,011,873 A | 1/2000 | Desai et al. |
| 6,015,088 A | 1/2000 | Parker et al. |
| 6,019,286 A | 2/2000 | Li et al. |
| 6,036,095 A | 3/2000 | Seo |
| 6,055,552 A | 4/2000 | Curry |
| 6,060,722 A | 5/2000 | Havens et al. |
| 6,062,475 A | 5/2000 | Feng |
| 6,076,731 A | 6/2000 | Terrell |
| 6,076,738 A | 6/2000 | Bloomberg et al. |
| 6,094,509 A | 7/2000 | Zheng et al. |
| 6,095,418 A | 8/2000 | Swartz et al. |
| 6,098,887 A | 8/2000 | Figarella et al. |
| 6,101,487 A | 8/2000 | Yeung |
| 6,105,871 A | 8/2000 | Campo et al. |
| 6,115,513 A | 9/2000 | Miyazaki et al. |
| 6,122,410 A | 9/2000 | Zheng et al. |
| 6,123,263 A * | 9/2000 | Feng ................. 235/462.42 |
| 6,129,278 A | 10/2000 | Wang et al. |
| 6,149,063 A | 11/2000 | Reynolds et al. |
| 6,195,122 B1 | 2/2001 | Vincent |
| 6,212,504 B1 | 4/2001 | Hayosh |
| 6,220,509 B1 | 4/2001 | Byford |
| 6,223,988 B1 | 5/2001 | Batterman et al. |
| 6,285,916 B1 | 9/2001 | Kadaba et al. |
| 6,290,132 B1 | 9/2001 | Dickson et al. |
| 6,298,176 B2 | 10/2001 | Longacre, Jr. et al. |
| 6,321,992 B1 | 11/2001 | Knowles et al. |
| 6,330,975 B1 | 12/2001 | Bunte et al. |
| 6,336,587 B1 | 1/2002 | He et al. |
| 6,340,114 B1 | 1/2002 | Correa et al. |
| 6,347,163 B2 | 2/2002 | Roustaei |
| 6,385,352 B1 | 5/2002 | Roustaei |
| 6,386,452 B1 * | 5/2002 | Kawamura ................. 235/454 |
| 6,398,112 B1 | 6/2002 | Li et al. |
| 6,462,842 B1 | 10/2002 | Hamilton |
| 6,494,375 B1 | 12/2002 | Ishibashi et al. |
| 6,512,218 B1 | 1/2003 | Lanini et al. |
| 6,539,360 B1 | 3/2003 | Kadaba |
| 6,561,428 B2 | 5/2003 | Meier et al. |
| 6,585,159 B1 | 7/2003 | Meier et al. |
| 6,637,658 B2 | 10/2003 | Barber et al. |
| 6,641,046 B2 | 11/2003 | Durbin |
| 6,681,994 B1 | 1/2004 | Koenck |
| 6,688,523 B1 | 2/2004 | Koenck |
| 7,178,733 B2 | 2/2007 | Zhu et al. |
| 2001/0027995 A1 * | 10/2001 | Patel et al. ................. 235/383 |
| 2001/0055422 A1 | 12/2001 | Roustaei |
| 2002/0039099 A1 | 4/2002 | Harper |
| 2002/0125317 A1 | 9/2002 | Hussey et al. |
| 2002/0135683 A1 | 9/2002 | Tamama et al. |
| 2002/0170970 A1 | 11/2002 | Ehrhart |
| 2002/0171745 A1 | 11/2002 | Ehrhart |
| 2003/0029917 A1 | 2/2003 | Hennick et al. |
| 2003/0046192 A1 | 3/2003 | Eguchi et al. |
| 2003/0206150 A1 | 11/2003 | Hussey et al. |
| 2003/0209605 A1 | 11/2003 | Walczyk et al. |
| 2003/0226895 A1 | 12/2003 | Havens et al. |
| 2003/0229793 A1 | 12/2003 | McCall et al. |
| 2004/0134989 A1 | 7/2004 | Meier et al. |
| 2004/0134990 A1 | 7/2004 | Fitch et al. |
| 2005/0001035 A1 | 1/2005 | Hawley et al. |
| 2005/0056699 A1 | 3/2005 | Meier et al. |
| 2005/0103854 A1 | 5/2005 | Zhu et al. |
| 2005/0103864 A1 | 5/2005 | Zhu et al. |
| 2005/0145698 A1 | 7/2005 | Havens et al. |
| 2006/0126129 A1 | 6/2006 | Barber et al. |
| 2006/0203092 A1 | 9/2006 | Nobori et al. |
| 2007/0012777 A1 | 1/2007 | Tsikos et al. |
| 2007/0034696 A1 | 2/2007 | Barkan et al. |
| 2007/0040035 A1 | 2/2007 | Kotlarsky et al. |
| 2007/0241195 A1 | 10/2007 | Hussey et al. |

FOREIGN PATENT DOCUMENTS

| | | |
|---|---|---|
| EP | 0999514 A1 | 5/2000 |
| JP | 63-311474 | 12/1988 |
| JP | 1-216486 | 8/1989 |
| JP | 03-020058 | 1/1991 |
| JP | 4-257844 | 9/1992 |
| JP | 6-250775 | 9/1994 |
| JP | 10-224773 A | 8/1998 |
| WO | WO 92/02371 | 2/1992 |
| WO | WO 92/17861 | 10/1992 |
| WO | WO 95/13196 | 5/1995 |
| WO | WO 95/24278 | 9/1995 |
| WO | WO 95/34043 | 12/1995 |
| WO | WO 96/39676 | 12/1996 |
| WO | WO 97/08647 | 3/1997 |
| WO | WO 99/50736 | 10/1999 |
| WO | WO 00/72246 | 11/2000 |
| WO | WO 01/22358 | 3/2001 |
| WO | WO 01/26036 A3 | 4/2001 |
| WO | WO 02/063543 A2 | 8/2002 |
| WO | WO 02/073953 A2 | 9/2002 |
| WO | WO 02/080520 | 10/2002 |
| WO | WO 03/102859 A1 | 12/2003 |
| WO | WO 03/104854 A2 | 12/2003 |
| WO | WO 2005/078634 A2 | 8/2005 |

OTHER PUBLICATIONS

Gonzalez; Woods, "Digital Image Processing," Library of Congress, 10 page article, pp. 417-425 and pp. 452-457; Copyright 1992 by Addison Wesley Publishing Company, Inc.

International Search Report for International Patent Application No. PCT/US02/15095 dated Feb. 12, 2002.

* cited by examiner

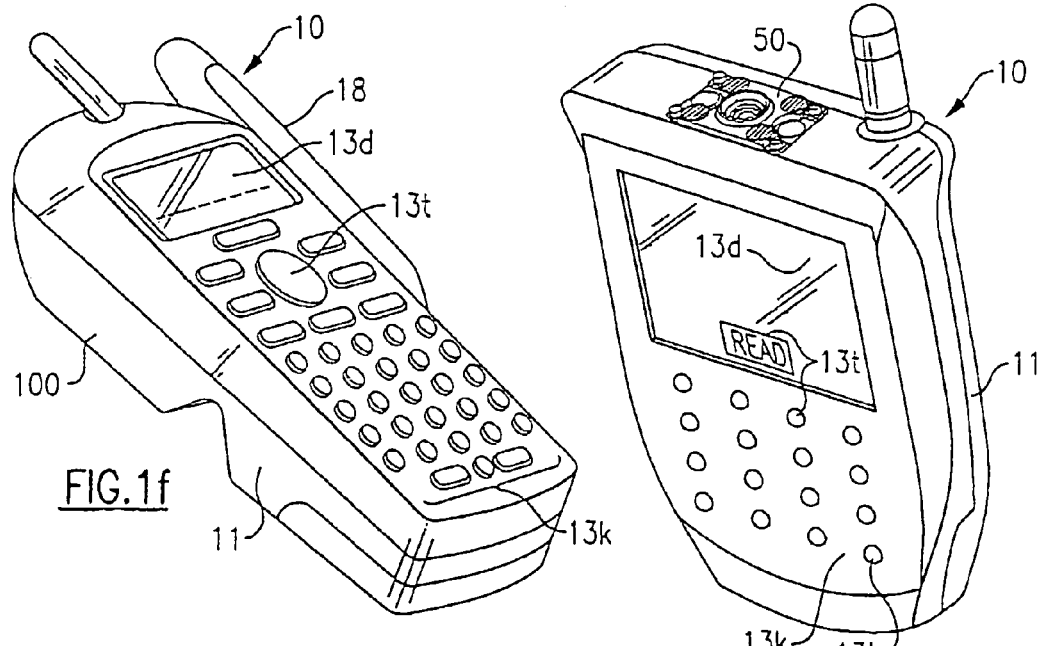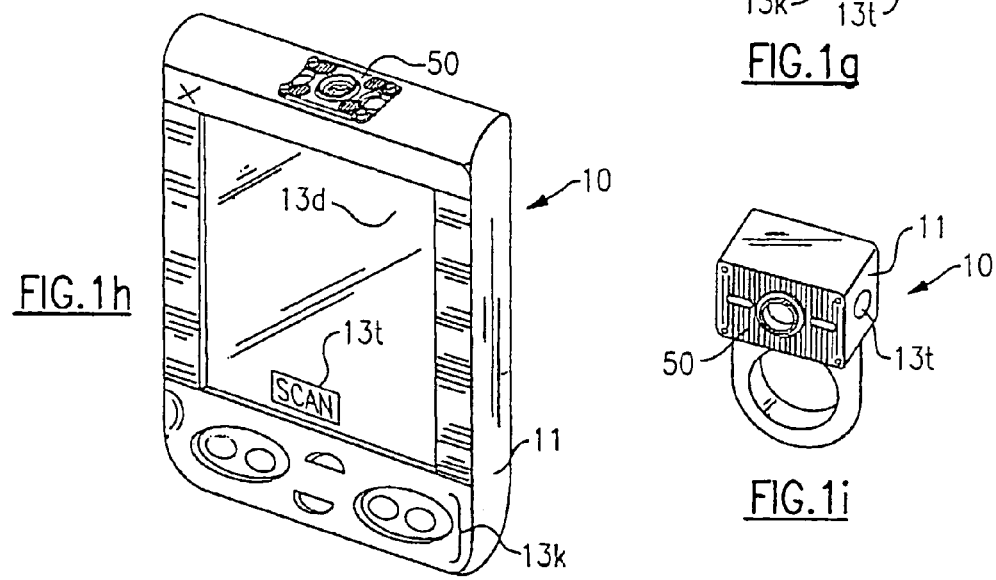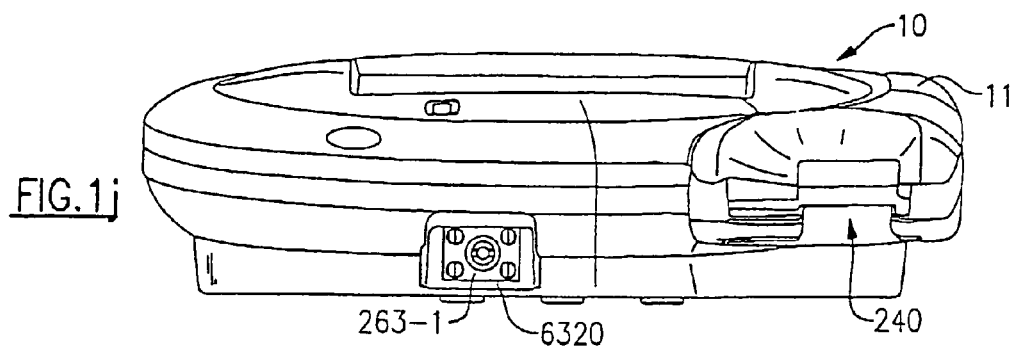

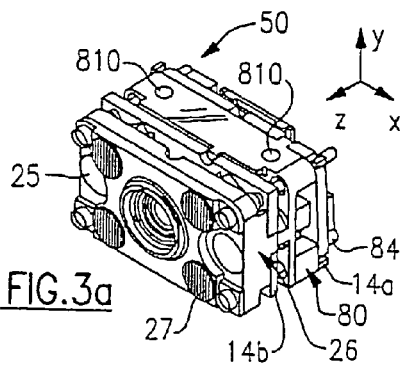
FIG.3a
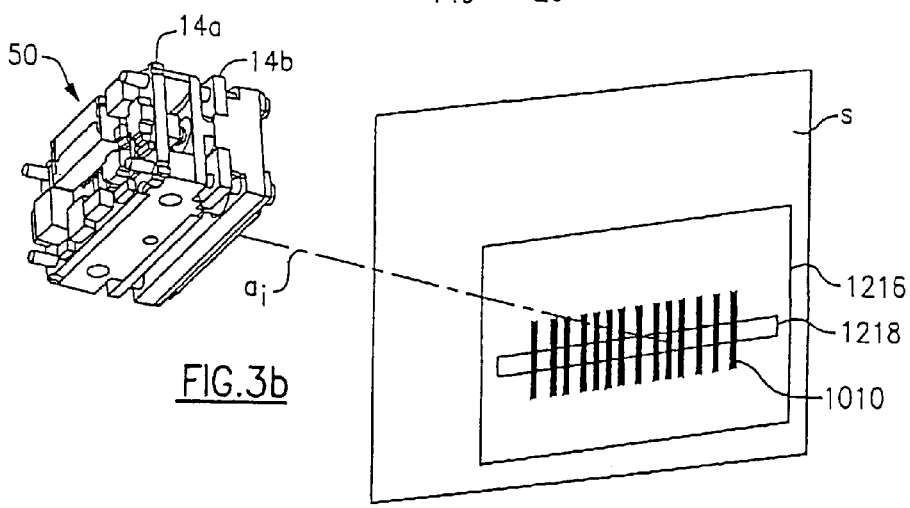
FIG.3b
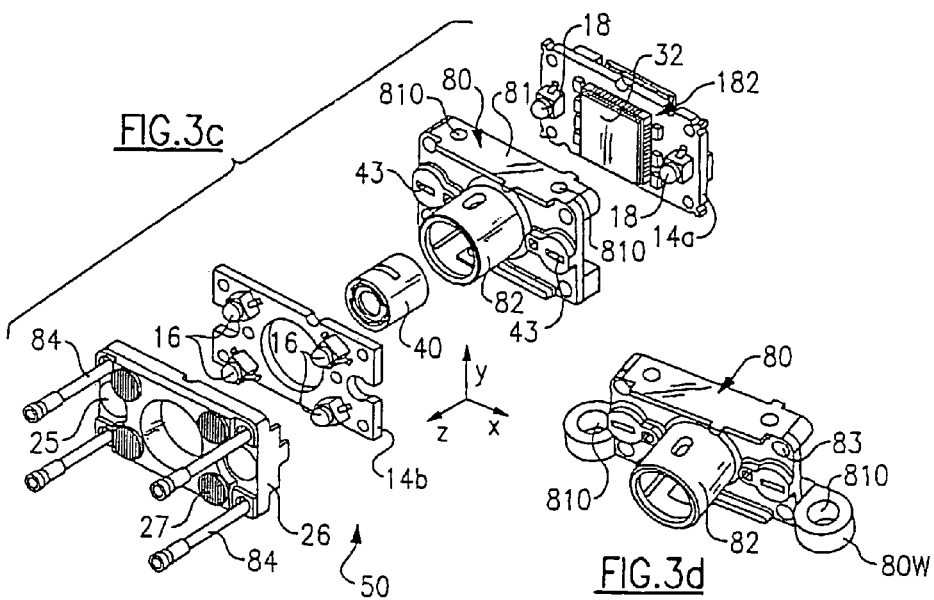
FIG.3c
FIG.3d

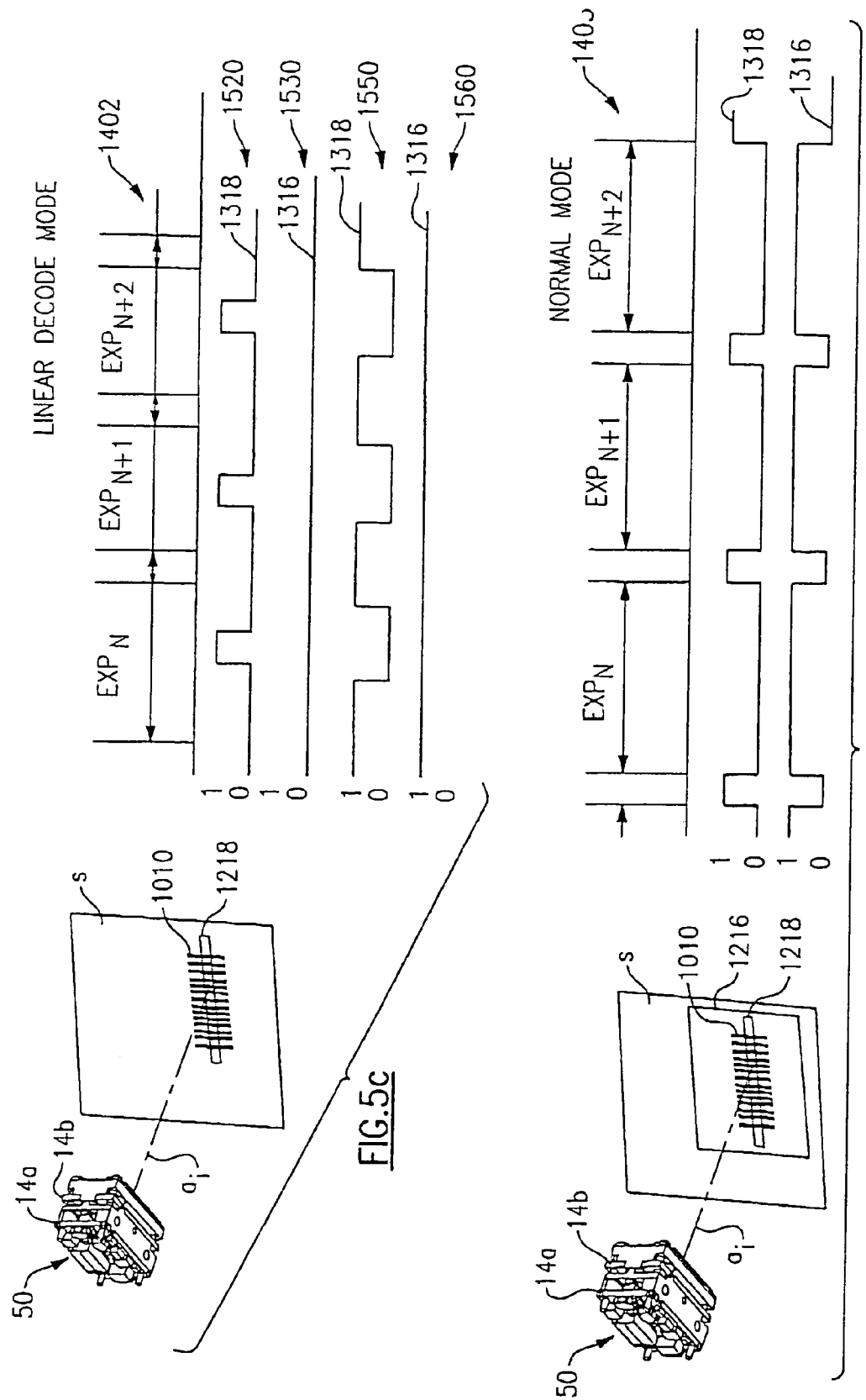

PICTURE TAKING OPTICAL READER

CROSS REFERENCE TO RELATED APPLICATIONS

This application claims priority under 35 U.S.C. §119 of Provisional Application No. 60/470,016 filed May 12, 2003, entitled "Picture Taking Optical Reader." The priority of the above application is claimed, and the disclosure of the above application is incorporated herein by reference in its entirety.

FIELD OF THE INVENTION

This invention relates generally to optical readers and specifically to an optical reader configured to take pictures.

BACKGROUND OF THE INVENTION

Optical readers tend to fall into one of three classes: wand readers, laser scan engine optical readers and image sensor based optical readers.

Wand readers generally comprise a single light source and single photodetector housed in a pen shaped housing. A user drags the wand reader across a decodable symbol (e.g., a bar code) and a signal is generated representative of the bar space pattern of the bar code.

Laser scan engine based optical readers comprise a laser diode assembly generating a laser light beam, a moving mirror for sweeping the laser light beam across a decodable symbol and a signal is generated corresponding to the decodable symbol.

Image sensor based optical readers comprise multielement image sensors such as CID, CCD, and CMOS image sensors and an imaging optic for focusing an image onto the image sensor. In operation of an image sensor based optical reader, an image of a decodable symbol is focused on an image sensor and a signal is generated corresponding to the signal.

Because of numerous advances provided by image sensor based optical readers, users of laser scanner engine based optical readers have been switching in increasing numbers to image sensor based optical readers. Image sensor based optical readers are more durable and offer additional features relative to laser scan engine based bar code readers. One function which has been incorporated into image sensor based optical readers is a picture taking function. Optical readers have been developed which can both take pictures and decode decodable symbols represented in captured image data.

U.S. Pat. No. 5,392,447 describes a hand held image sensor based optical reader having a "Photo Mode" and a "Text Mode" In the "Photo Mode," images are captured and subjected to image compression. In a "Text Mode" decodable symbols are subjected to decoding.

U.S. Pat. No. 6,298,176, issued Oct. 2, 2001, entitled "Symbol-Controlled Image Data Reading System" describes an optical reader, which determines an image data-reading region from an image reading instruction symbol within an image and then reads image data from the image data-reading region.

In spite of the advances such as those embodied in the described prior art, it would be useful to even further advance operational functionality of picture taking optical reader.

SUMMARY OF THE INVENTION

According to its major aspects and broadly stated, the invention is a picture taking bar code reader. As explained in copending application Ser. No. 10/143,158, filed May 10, 2002, incorporated by reference, it is useful to use an imaging based optical reader to take pictures (e.g., of a package including a bar code).

In one aspect, the invention includes an optical reader having a decode mode of operation and a picture taking mode of operation. In the decode mode of operation, a control circuit of the reader loads at least one decode mode camera control parameter, captures a frame of image data utilizing said at least one decode mode camera control parameter, decodes a decodable symbol representation in said captured frame of image data, and outputs a decoded-out message. In the picture taking mode of operation, a control circuit loads at least one picture taking camera control parameter, captures a frame of image data utilizing the picture taking camera control parameter, and without attempting to decode decodable symbol in said frame, outputs said frame of captured image data.

According to the invention, a "decode mode" camera control parameter is one which is established for the purpose of aiding in the capture of a frame of image data which is optimized to be subjected to decoding. A "picture taking mode" camera control parameter, as refereed to herein, is one which is established for the purpose of aiding in the capture of a frame of image data which is optimized for visual output quality.

In another aspect, the invention includes an optical reader having a decode mode of operation and an automatic imaging mode of operation. In the decode mode of operation, a control circuit of the reader loads a decode mode operational parameter, captures a frame of image data utilizing the parameter, decodes a decodable symbol representation in the captured frame of image data, and outputs a decoded-out message. In the automatic imaging mode of operation, the control circuit of the reader captures a frame of image data, and evaluates the image data to determine whether the image data includes a graphical symbol. The reader may then process the image data in a manner that depends on the result of the image evaluation.

In another aspect, the invention includes an imaging device having a picture taking mode of operation and an automatic imaging mode of operation. In the picture taking mode, a control circuit of the device loads a picture taking mode operational parameter, captures a frame of image data utilizing the parameter, and without attempting to decode a decodable symbol representation therein, outputs the captured frame of image data. In the automatic imaging mode of operation, the control circuit of the reader captures a frame of image data, and evaluates the image data to determine whether the image data includes a graphical symbol. The reader may then process the image data in a manner that depends on the result of the image evaluation.

In another aspect, the invention includes an optical reader having a picture taking mode of operation, a decode mode of operation, and an improvement mode of operation. In an improvement mode of operation, the control circuit of the reader improves the visual display or print (visual output) quality of the last captured frame of image data captured by the optical reader.

These and other details, advantages and benefits of the present invention will become apparent from the detailed description of the preferred embodiment and the associated drawings.

BRIEF DESCRIPTION OF THE DRAWINGS

For a further understanding of these and objects of the invention, reference will be made to the following detailed description of the invention which is to be read in connection with the accompanying drawing, wherein:

FIG. 1b-1j shows various optical reader form factors according to the invention;

FIGS. 3a-3d show various uses of an imaging module;

FIGS. 5a-5d show various timing diagrams illustrating possible embodiments of a linear decode mode according to the invention;

DETAILED DESCRIPTION OF THE INVENTION

A optical reader, according to the invention, is decoptied in use in FIG. 1. In a first "decode mode" reader 10 is utilized to decode a bar code 1010 such as a bar code on a package 1012. In a "picture taking" mode, reader 10 is utilized to take a picture of package 1020 carrying bar code 1010, or a storage container, or a trailer box 1030 or a signature or a face. In an automatic imaging mode, reader 10 captures an image, classifies the image, and processes the image in a manner that depends on the image classification.

Figure 1A:
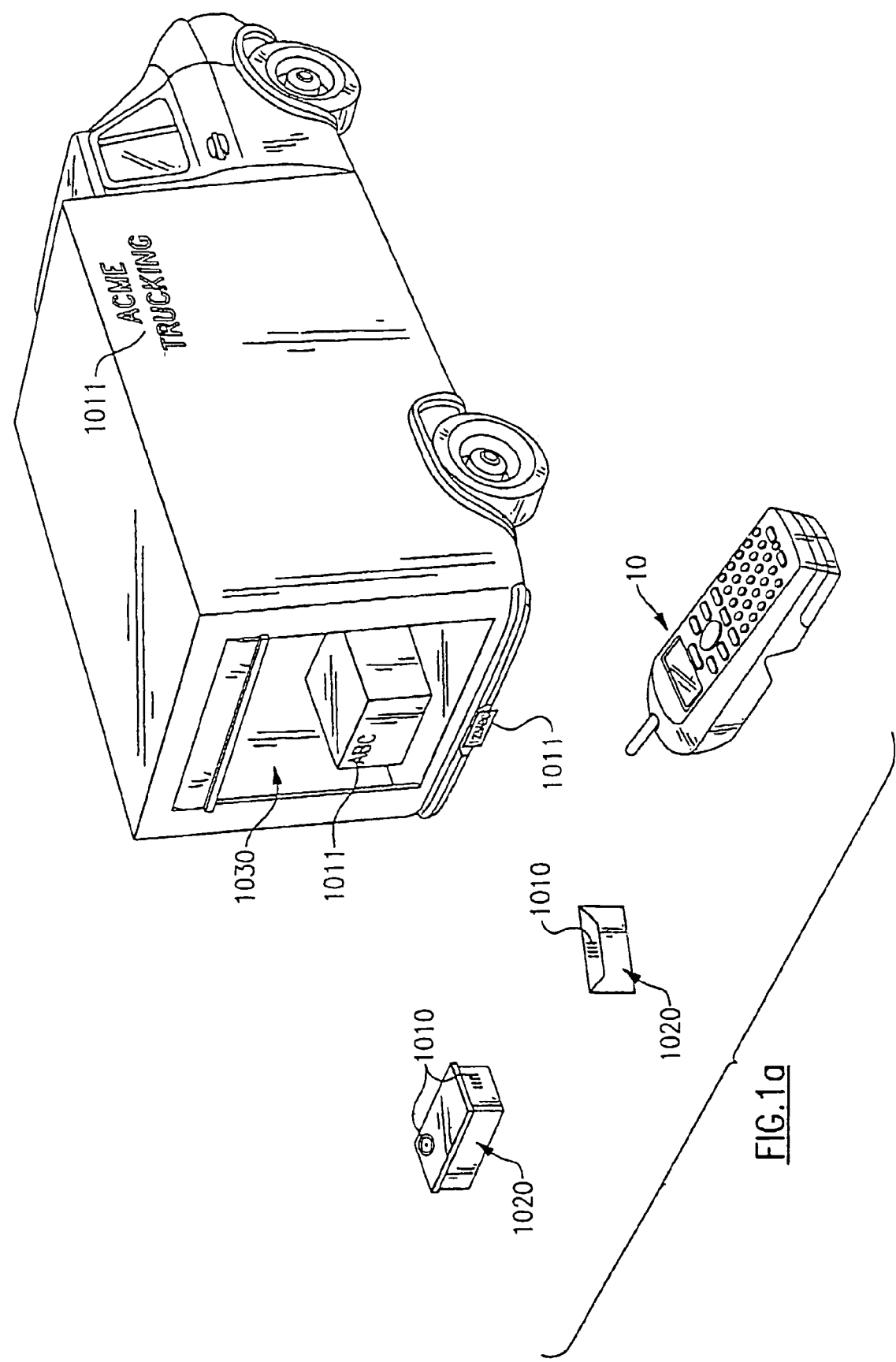
FIG. 1a depicts a reader in use in an operating environment according to the invention.
Figure 1B:
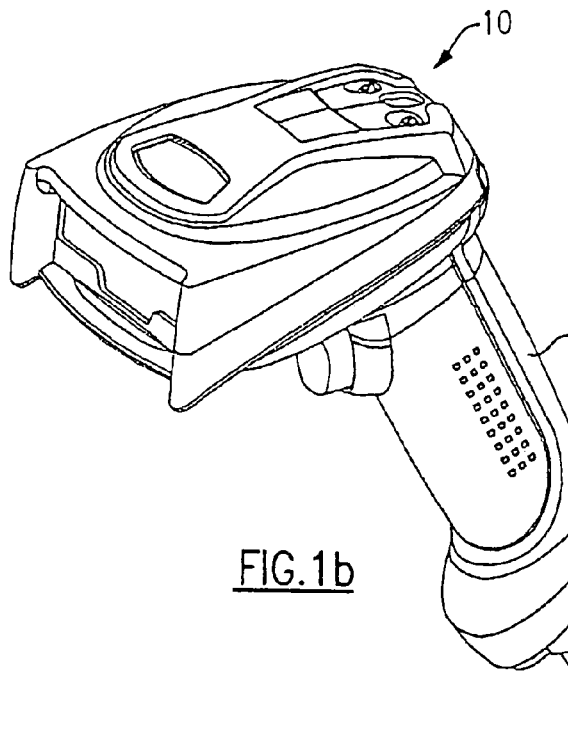
Figure 1C:
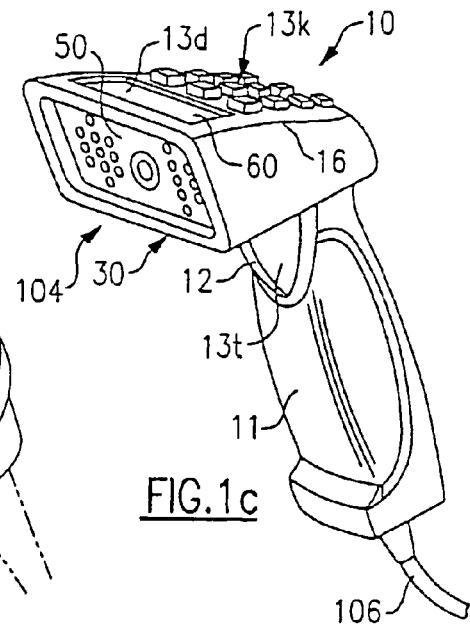
Figure 1D:
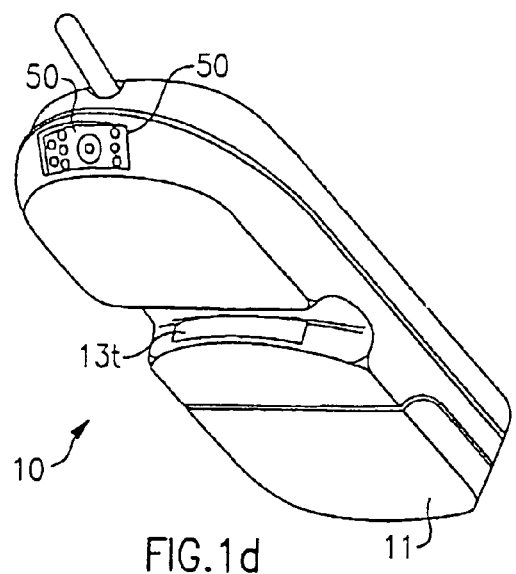
Figure 1E:
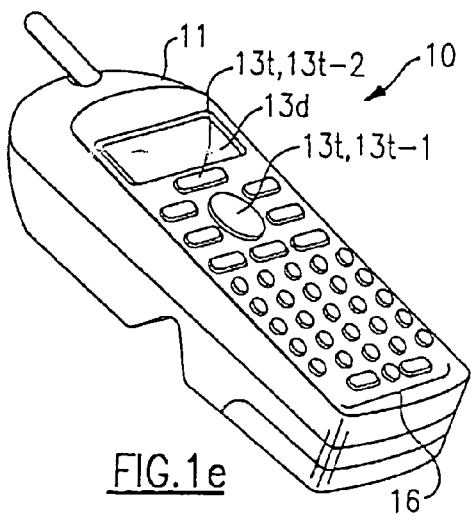

Housings for optical readers in which the invention can be employed are shown in FIG. 2. In FIG. 1b, a gun style optical reader is shown as described in copending application Ser. No. 10/339,275, filed Jan. 9, 2003, entitled "Housing For An Optical Reader," incorporated by reference. An imaging module (not shown) is incorporated in the reader housing 11. In FIG. 1c, a gun style reader 10 is shown having an integrated keyboard 13k and display 13d. In FIGS. 1d, 1e and 1f, a portable data terminal (PDT) style reader is shown having a keyboard 13k and a display 13d. In FIG. 1f, an embodiment is shown wherein display 13d includes an associated touch screen overlay and which further includes a stylus for entering signature information. In FIG. 1g, a cellular phone is shown which has a display 13d and keyboard 13k and which incorporates an imaging module 500. In the embodiment of FIG. 1h, a reader 10 comprises a portable data terminal (PDA). In the embodiment of FIG. 1j, reader 10 is in the form of a transaction terminal including card reader 240, as is described in U.S. patent application Ser. No. 10/339,444, filed Jan. 9, 2003, entitled, "Transaction Terminal Comprising Imaging Module," incorporated by reference. Numerous other form factors are possible. For example, in U.S. application Ser. No. 10/092,789, filed Mar. 7, 2002, entitled "Optical Reader For Imaging Module," incorporated by reference, a pen style optical reader is shown. In U.S. application Ser. No. 09/432,282, filed Nov. 2, 1999, entitled "Indicia Sensor System For Optical Reader," incorporated by reference, a reader is shown which rests on a "scan stand."

An imaging module 50 which may be incorporated into a reader housing to form an optical reader is described with reference to FIGS. 3a-3d. Imaging module 50 may be an IT 4000 imaging module of the type available from Hand Held Products, Inc. of Skaneateles Falls, N.Y. IT4000 imaging modules available from Hand Held Products, Inc. are available with associated decode circuits which may be actuated to decode a decodable indicia, such as bar code indicia, within a captured image. Imaging module 50 can be at IT4200 imaging module with an associated decode-out circuit, also available from Hand Held Products, Inc. Imaging module 50 includes a support 80 having a containment 81 containing image sensor 32 incorporated on chip 182, and a retainer section 82 retaining a lens assembly 40 provided by a lens barrel. Lens assembly 40 includes a lens or lenses which focus images from a substrate (as seen in FIG. 3b) onto image sensor 32. In one embodiment, lens assembly 40 is configured so that module 50 has a fixed best focus receive distance of less than two feet (e.g., 3 inches, 5 inches, 7 inches, 15 inches). Configuring lens assembly 40 so that module 50 has a best focus receive distance of less than two feet allows module 50 to capture high resolution images at short range, from which decodable indicia can readily be decoded. Module 5 can also be configured so that module 50 has a best focus distance of several feet such as 5 feet or more as is described in U.S. application Ser. No. 10/252,484, filed Sep. 23, 2002, entitled "Long Range Optical Reader," incorporated by reference. Module 50, can also include an adjustable lens assembly for providing an adjustable best focus receive distance.

Referring to further aspects of module 50, a first circuit board 14a carrying image sensor chip 182 and aiming LEDs 18 is mounted to a back-end of support 80 while a front circuit board 14b carrying illumination LEDs 16 is mounted to a front end of support 80. An optical plate 26 carrying aiming and illumination optics is disposed forward of second circuit board 14b. Supporting the various component of imaging module 50 is a plurality of conductive support posts 84. As shown in FIG. 3d, support 80 can include integrated mounting wings 80w aiding in the mounting of module 50 within module 10. Imaging module 50 is fully assembled into a form substantially shown in FIGS. 3a and 3b, prior to being installed in reader housing 11. Further aspects of module 50 and variations thereof are described in U.S. patent application Ser. No. 10/092,789, filed Mar. 7, 2002, entitled "Optical Reader For Imaging Module," incorporated herein by reference.

Referring to FIG. 3b, illumination LEDs 16 together with illumination optics including diffusers 27, project an illumination pattern 90 onto a substrate s. Illumination pattern 1216 at normal working distances substantially corresponds to a field of view of imaging module 50. Aiming LEDs 18 together with aiming optics 43, 25 project an aiming pattern 1218 onto a substrate. Aiming pattern 1218 aids in the alignment of imaging module 50 relative to a target. If reader 10 is moved so that aiming pattern 1218 is located on a target indicia 1010 such as the bar code shown in FIG. 3b, there is strong assurance that target indicia 94 is within a field of view of imaging module 50.

Figure 4A:
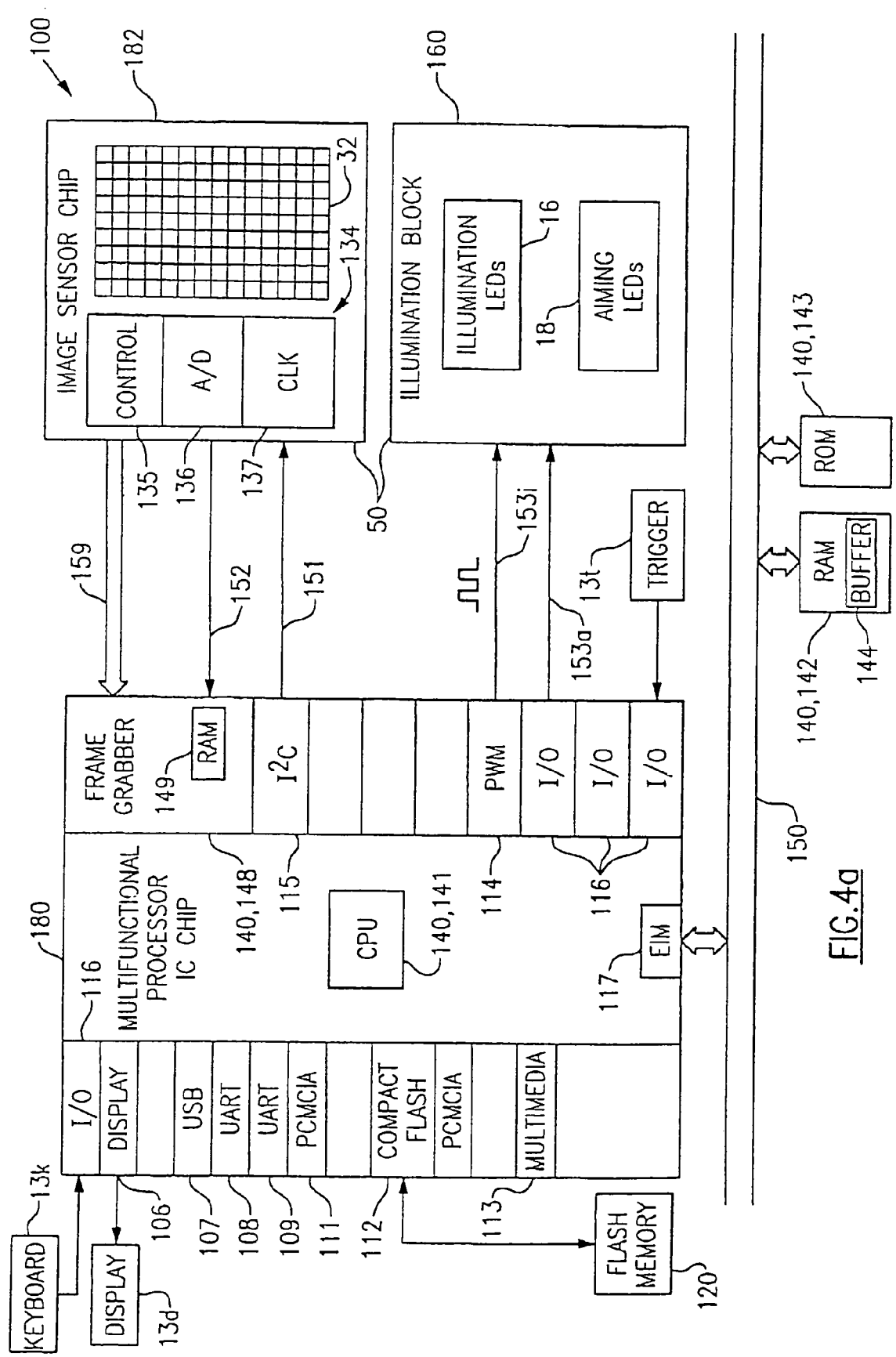
FIG. 4a is a block diagram of an electrical circuit according to the invention.

In FIG. 4a, a block diagram of an optical reader electrical circuit is shown having a multi-functional processor IC chip 180 including an integrated frame grabber block 148. Electrical circuit 100 shown in FIG. 4a can be utilized for control of a single 2D imaging module optical reader as is shown for example in U.S. Ser. No. 09/954,081, filed Sep. 17, 2001, entitled "Imaging Device Having Indicia-Controlled Image Parsing Mode," which is hereby incorporated herein by reference in its entirety.

In the specific embodiment of FIG. 2a, electrical circuit 100 includes a control circuit 140 comprising CPU 141, system RAM 142 and system ROM 143 and frame grabber block 148. Electrical circuit 100 further includes an image sensor 32 typically provided by a photosensitive array and an illumination block 160 having illumination LEDs 16 and aiming LEDs 18 as shown in the physical form view of FIGS. 3a-3c. Image sensor 32 of FIG. 2a is shown as being provided by a 2D photo diode array. If a 1D image sensor replaces image sensor 32, then aiming LEDs 18 and illumination LEDs 16 may be constituted by one set of LEDs. In the embodiment shown, image sensor 32 is incorporated in an image sensor IC chip 182 which typically further includes an image sensor electrical circuit block 134. Image sensor electrical block 134 includes control circuit 135 for controlling image sensor 32, an A/D conversion circuit 136, for converting analog signals received from image sensor 32 into digital form and integrated clock 137 sometimes referred to as an oscillator.

In the embodiment shown in FIG. 4a, CPU 141 and frame grabber block 148 are incorporated in a multi-functional IC chip 180 which in addition to including CPU 141 includes numerous other integrated hardware components. Namely, multifunctional IC chip 180 may include a display control block 106, several general purpose I/O ports 116, several interface blocks such as a USB circuit block 107 and a UART block 108 for facilitating RS 232 communications, a UART block 109 for facilitating infra-red communications (including communication according to standards promulgated by the INFRARED DATA ASSOCIATION$_7$ (IrDA$_7$), a trade association for defining infrared standards), and a pulse width modulation (PWM) output block 110. Multi-functional processor IC chip 180 can also have other interfaces such as a PCMCIA interface 111, a compact flash interface 112, and a multimedia interface 113. If reader 10 includes a display 13d, display 13d may be in communication with chip 180 via display interface 106. Trigger 13t and keypad 13k may be in communication with chip 180 via general purpose I/O interface 116. Physical form views of readers having displays and keyboards are shown for example in U.S. patent application Ser. No. 10/137,484, filed May 2, 2002, entitled "Optical Reader Comprising Keyboard," which is hereby incorporated herein by reference in its entirety. Multi-functional processor IC chip 180 may be one of an available type of multifunctional IC processor chips which are presently available such as a Dragonball MX 1 IC processor chip or a Dragonball MXL IC processor chip available from Motorola, a DSC IC chip of the type available from Texas Instruments, an O-Map IC chip of the type available from Texas Instruments, or a multifunctional IC processor chip of a variety known as Clarity SOC's (e.g., system on a chip) available from Sound Vision, Inc.

In one embodiment, multi-functional processor IC chip 180 comprises components that provide at least the functions provided by a CPU 140, system RAM 142 and system ROM 143. In some embodiments, it is advantageous that microprocessor-based decoder module 180 comprises an integrated circuit device having integrated therein a microprocessor, an analog-to-digital converter, a digital-to-analog converter, a direct memory access (DMA) channel, a bi-directional communication line for communication with a sensor such as either or both of line 151 and 152, and a channel for data receipt from a sensor, such as data line 159 that brings data to frame grabber 148. The microprocessor-based IC chip 180 can comprise semiconductor materials, optical materials, and photonic band gap materials. In some embodiments, it is advantageous that the multi-functional processor IC Chip 180 further comprise I/O 116 suitable to accept user input (for example from a keyboard 13k), interface capability for "flash" memory devices such as "Multimedia" (MMC), "Smart Media," "Compact Flash," and "Memory Stick." Other features that may be used to advantage include pulse width modulators (PWMs), serial communication channels (e.g., UARTs, SPIs, and USBs), display drivers and controllers such as for an LCD, wireless communication capability such as Bluetooth and 802.11 (a), (b), and (g)-compatible transmitter/receivers, sequence control modules such as timer banks, sensor controllers, audio generators, audio coder/decoders ("codecs"), speech synthesizers, and speech recognition hardware and/or software.

Frame grabber block 148 of IC chip 180 replaces the function of a frame grabbing field programmable gate array (FPGA) as discussed in commonly assigned U.S. patent application Ser. No. 09/954,081, filed Sep. 17, 2001, entitled "Imaging Device Having Indicia-Controlled Image Parsing Mode," and U.S. patent application Ser. No. 09/904,697, filed Jul. 13, 2001, entitled "An Optical Reader Having a Color Imager," both of which are hereby incorporated herein by reference in their entirety. More particularly, frame grabber block 148 is specifically adapted collection of hardware elements programmed to carry out, at video rates or higher, the process of receiving digitized image data from image sensor chip 182 and writing digitized image data to system RAM 142 which in the embodiment shown is provided on a discreet IC chip. Frame grabber block 148 includes hardware elements preconfigured to facilitate image frame capture. Frame grabber block 148 can be programmed by a user to capture images according to a user's system design requirements. Programming options for programming frame grabber block 148 include options enabling block 148 to be customized to facilitate frame capture that varies in accordance with image sensor characteristics such as image sensor resolution, clockout rating, and fabrication technology (e.g., CCD, CMOS, CID), dimension (1D or 2D), tonality (from 1 to N-bits), color (monochrome or color), biometric features, such as fingerprints, retinal patterns, facial features, and one- and two-dimensional patterns that can provide information, such as chromatography patterns and electrophoretic patterns of mixtures of substances, including substances such as biological samples comprising DNA. A decoder board adapted to operate in a manner dependent on sensor attached thereto is described in U.S. patent application Ser. No. 10/339,439, filed Jan. 9, 2003, entitled, "Decoder Board For An Optical Reader Utilizing A Plurality Of Imaging Formats," incorporated by reference.

Aspects of the operation of circuit 100 when circuit 100 captures image data into RAM 140 are now described. Circuit 100 can perform a cycle of receiving a frame of image data, performing internal programming functions, and decoding the frame of image data in a time period of less than or equal to a second. In a more preferred embodiment, the circuit 100 performs the cycle in a time period of less than or equal to $\frac{1}{30}$ of a second. It is expected that in a still more preferred embodiment, the time period can be less than or equal to $\frac{1}{270}$ of a second. When trigger 13t is pulled, CPU 141, under the operation of a program stored in system ROM 143, writes an image capture enable signal to image sensor chip 182 via communication line 151. Line 151, like the remainder of communication lines described herein represents one or more physical communication lines. In the embodiment shown, wherein image sensor chip 182 is of a type available from IC Media Corp., I$^2$C interface 115 of chip 180 is utilized to facilitate communication with chip 182 (if another image sensor chip is selected another type of interface e.g., interface 116 may be utilized). Other types of signals may be sent over line 151 during the course of image capture. Line 151 may carry, for example, timing initialization, gain setting and exposure setting signals.

When control block 135 of image sensor chip 182 receives an image capture enable instruction, control block 135 sends various signals to frame grabber block 148. Image sensor control block 135 typically sends various types of synchronization signals to frame grabber block 148 during the course of capturing frames of image data. In particular, control block 135 may send to frame grabber block 148 "start of frame signals" which inform frame grabber block 148 that chip 182 is ready to transmit a new frame of image data, "data valid window" signals which indicate periods in which a row of image data is valid, and "data acquisition clock" signals as established by clock 137 controlling the timing of image data capture operations. In the embodiment described, line 152 represents three physical communication lines, each carrying one of the above types of signals. In an alternative embodiment, vertical and horizontal synchronization signals are processed by frame grabber 148 to internally generate a data valid window signal. Frame grabber block 148 appropriately responds to the respective synchronization signals, by establishing buffer memory locations within integrated RAM 149 of block 148 for temporary storage of the image data received from image sensor chip 182 over data line 159. At any time during the capture of a frame of image data into system RAM 142, buffer RAM 149 of frame grabber block 148 may store a partial (e.g., about 0.1 to 0.8) or a full line of image data.

Referring to further aspects of electrical circuit 100, circuit 100 includes a system bus 150. Bus 150 may be in communication with CPU 141 via a memory interface such as EIM interface 117 of IC chip 180. System RAM 142 and system ROM 143 are also connected to bus 150 and in communication with CPU 141 via bus 150. In the embodiment shown, RAM 142 and ROM 143 are provided by discreet IC chips. System RAM 142 and system ROM 143 could also be incorporated into processor chip 180.

In addition to having system RAM 142, sometimes referred to as "working" RAM, electrical circuit 100 may include one or more long-term storage devices. Electrical circuit 100 can include for example a "flash" memory device 120. Several standardized formats are available for such flash memory devices including: "Multimedia" (MMC), "Smart Media," "Compact Flash," and "Memory Stick." Flash memory devices are conveniently available in card structures which can be interfaced to CPU 141 via an appropriate "slot" electro mechanical interface in communication with IC chip 180. Flash memory devices are particularly useful when reader 5 must archive numerous frames of image data. Electrical circuit 100 can also include other types of long term storage such as a hard drive which may be interfaced to bus 150 or to an appropriate I/O interface of processor IC chip 180.

In a further aspect of electrical circuit 100, control circuit 140 is configured to control the turning "OFF" and turning "ON" of LEDs 16, 18 of illumination block 160. Control circuit 140 preferably controls illumination block 160 in a manner that is coordinated with the capturing of the frames of image data. Illumination LEDs 16 are typically "ON" during at least a portion of frame capture periods. Configuring circuit 140 so that LEDs 16, 18 have "OFF" periods significantly reduces the power consumption of circuit 100.

In a further aspect of the electrical circuit 100, electrical circuit 100 can be configured so that PWM output interface 114 of IC chip 180 controls illumination LEDs of an imaging module such as illumination LEDs 16 of module 10-1 or aiming/illumination LEDs 18 of module 10-2.

In one embodiment, illumination block 160 is in communication with PWM output interface 114 and configured in such manner that LEDs 16 are turned "ON" at a leading edge of PWM pulses output at PWM interface 114, and are turned "OFF" at falling edges of PWM pulses output at PWM interface 114. PWM interface 114 should be configured so that several pulses are generated and sent over communication line 153i during the time that a single row of pixels of image data are exposed to light prior to clocking out of pixel values corresponding to that row. Thus, illumination LEDs 16 would be turned "ON" and "OFF" several times during the exposure period for exposing a row of pixels to light. Further, the number of pulses output by PWM output 114 during the time that a single row of pixels are exposed should not vary substantially from row to row. The pixel clock signal received at frame grabber block 148 of IC chip 180 can be utilized to generate the PWM output. It can be seen, therefore, that multifunctional IC chip 180 including frame grabber block 148 and PWM output 114 greatly simplifies the task of developing PWM signals for use in controlling illumination LEDs 16 of module 10.

In another embodiment, PWM output 114 and illumination block 160 are configured so that PWM output 114 controls the intensity of illumination, not the on time/off time of illumination. Illumination LED block 160 in such an embodiment can include a power supply circuit which is interfaced to PWM output 114 such that the PWM signal output at PWM output 114 varies the voltage or current supplied to LEDs 16.

In a further aspect of electrical circuit 100, aiming LEDs 18 of circuit 100 can be controlled by a signal transmitted by a general purpose I/O port 116 of IC chip 180 over communication line 153a. Multifunctional processor IC chip 180 can be programmed so that an aiming LED control signal is caused to change to an "ON" state when frame grabber block 148 completes the process of capturing a complete frame of image data. Frame grabber block 148 may be configured to generate an "end of acquisition" or "end of frame" signal when frame grabber block 148 completes the process of capturing a complete frame of image data into RAM 142. When CPU 141 receives an "end of acquisition" signal, CPU 141 controls I/O port 116 to change the state of LED control signal 168. Control circuit 140 may also change the state of LED control signal 168 when generating a start of frame signal. Control circuit 140 may execute a delay prior to changing the state of signal 168. Control circuit 140 is programmed so that LED control signal 168 remains in an "ON" state known to be sufficiently short duration so as not to cause actuation of an aiming LED 18 during a succeeding frame exposure period. Configured in the manner described, aiming LEDs 18 are selectively pulsed "ON" for a short duration during intermediate successive frame exposure periods. Control circuit 140 in one mode of operation selectively turns illumination LEDs 16 "ON" during exposure periods and "OFF" intermediate exposure periods, and conversely turns aiming LEDs 18 "ON" intermediate frame exposure periods and "OFF" during exposure periods. To the user, given the frame rate, substrate "s", (FIG. 3b) appears to simultaneously have projected thereon aiming pattern 1218 and illumination pattern 1216 as indicated by FIG. 3b, though in an instant of time only one or the other of the patterns 1216, 1218 is actually present.

While aiming LEDs 18 may be turned "OFF" during frame exposure periods for energy conservation purposes and for purposes of more uniformly illuminating, a substrate "s", the inventors developed a mode of operation in which it is beneficial to turn aiming LEDs "ON" during a frame exposure period.

Figure 5A:
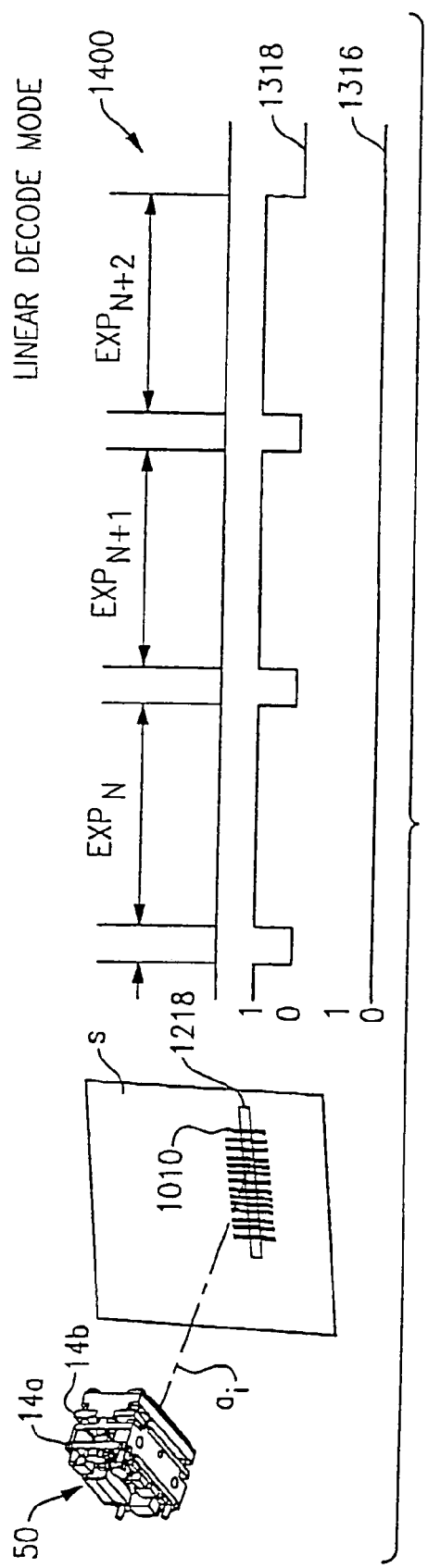

Control circuit 140 may be configured to operate in a "linear decode" mode of operation in which control circuit 140 is optimized for reading 1 dimensional bar codes (such as UPC/EAN, Code 39, Code 128, UPC, ITF, LED 1316). One example of a linear decode mode of operation is described with reference to FIG. 5a including time line 1400 in which aiming LED control signal 1318 and illumination LED 1616 signal are plotted against exposure periods $EXP_N$, $EXP_{N+1}$, $EXP_{N+2}$. In the linear decode mode described with reference to FIG. 5a, control circuit 140 turns aiming LEDs "ON"

during frame exposure periods $EXP_N$, $EXP_{N+1}$, $EXP_{N+2}$ and maintains illumination LEDs "OFF" throughout the time that control circuit 140 operates according to the linear decode mode. Thus, as shown in FIG. 5a, an operator of a reader 10 in which module 50 is incorporated will observe aiming line 1218 without there being an illumination pattern 1216 projected on a target substrate. Maintaining illumination LEDs16 "OFF" during the linear decode mode is useful for a variety of reasons. Maintaining illumination LEDs "OFF" during a linear decode mode conserves power. Maintaining illumination LEDs "OFF" during a linear decode mode also enhances the attention with which a user focuses on aiming pattern 1218. Turning "ON" aiming LEDs 18 increases the signal strength of image signals corresponding to pixel locations representing an area illuminated by pattern 1218, and aids a user in aligning a reader with a symbol to be read.

Control circuit 140 and module 50 may be configured so that in a linear decode mode, control circuit 140 preferentially processes image data corresponding to an area of a target substrate illuminated by aiming pattern 1218. Control circuit 140 can preferentially process image data within an area corresponding to aiming pattern 1218 by operating in a "partial frame mode" as described in U.S. patent application Ser. No. 09/766,922, filed Jan. 22, 2001, entitled "Optical Reader Having Reduced Parameter Determination Delay," incorporated by reference. U.S. patent application Ser. No. 09/766,806, filed Jan. 22, 2001, entitled "Optical Reader Having Partial Frame Operating Mode," also incorporated by reference. Control circuit 140 can also preferentially process image data corresponding to an area illuminated by aiming pattern 1218 by capturing a full frame of image data and then commencing a decode attempt by reading a line of pixel valves corresponding to an area of a target expected to be illuminated by aiming pattern 1218. The reading out of a line of image data during a 1 D symbology decode attempt is sometimes referred to by skilled artisans as "launching a scan line."

Another embodiment of a linear decode mode is illustrated with reference to FIG. 5b. In the linear decode mode depicted of FIG. 5b, aiming LEDs 18 are "ON" during exposure periods along with illumination LEDs 16. The embodiment of FIG. 5b in which both LEDs 16 and LEDs18 are "ON" during an exposure period is advantageous at least for the reason that it provides for a capture of a high quality two-dimensional image. The high quality two-dimensional image can be processed (e.g., for 1D decoding, 2D decoding, OCR) should a one-dimensional symbology decode attempt fail. It will be understood that any period as described herein can be characterized by a rapid turning "ON" and "OFF" of LEDs 16 or 18 during an exposure period, as is suggested by high-speed pulse segments 1516, 1518.

Figure 5B:
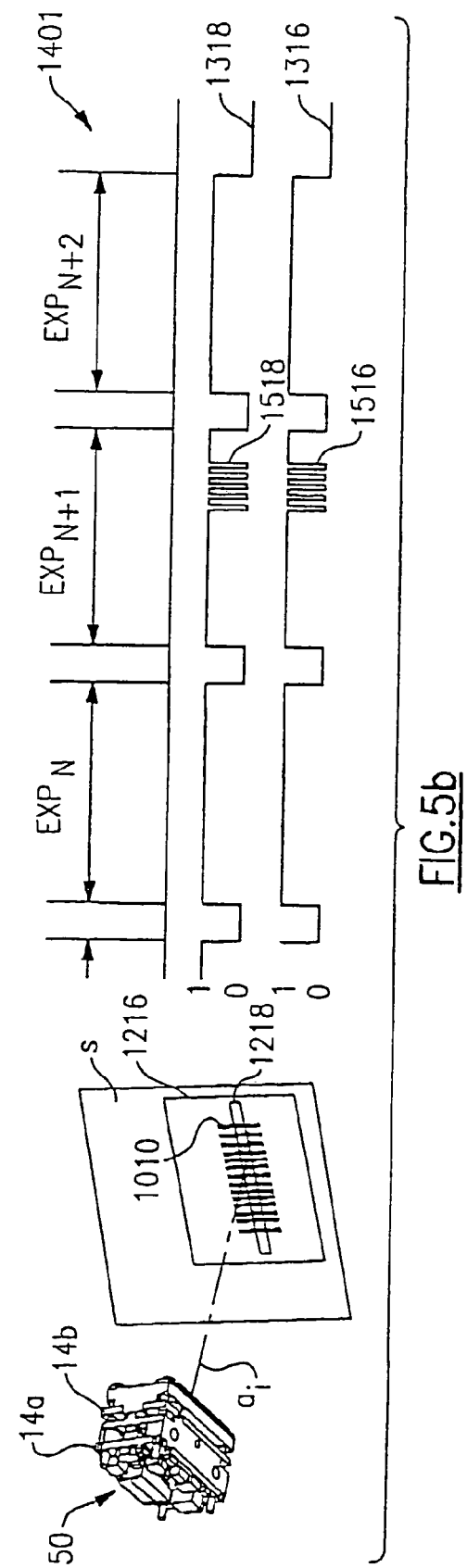

In the examples of FIGS. 5a and 5b, there is a delay between frame exposure periods $EXP_N$, $EXP_{N+1}$, $EXP_{N+2}$. An example of a linear decode mode implemented in a reader having overlapping frame exposure periods is explained with reference to FIG. 5c. Overlapping frame exposed periods are common when certain types of image sensors are used, e.g., CMOS and CID image sensors. In the embodiment described with reference to signal-time plots 1520, 1530 of FIG. 5c, aiming LEDs 18 are pulsed "ON" during exposure periods and illumination LEDs 16 are maintained "OFF" for the entire time the reader operates in the linear decode mode. Control circuit 140 and module 50 can be configured so that aiming LED control signal 1318 is selectively pulsed "ON" during the time that lines of pixels corresponding to area 1218 illuminated by LEDs 18 are being exposed. Signal-time plots 1550, 1560 of FIG. 5c illustrate possible operation of a reader having overlapping frame exposure periods in a "normal" mode of operation. Signal-time plot 1550 illustrates control of aiming LEDs 18 in a "normal" mode. Signal-time plot 1560 illustrates control of illumination LEDs 16 in a "normal" mode. In a "normal mode" of a reader having an overlapping frame exposure period, illumination LEDs 16 may be "ON" during course of time in which control circuit 140 captures frame of image data (LEDs 16 may actually be "flickered" as indicated by pulses 1516, 1516, FIG. 5b). Control circuit 140, however, selectively turns aiming LEDs 18 "ON" and "OFF" while operating in a "normal" mode. Specifically, while operating in a "normal" mode, control circuit 140 may selectively turn aiming LEDs 18 "OFF" during times that it is expected that middle rows of image sensor 32 are being exposed so that light from LEDs 18 (projected to define aiming pattern 1218) does not affect image signals generated by middle row pixels of image sensor 32. Because in accordance with signal-time plot 1550, LEDs 18 are "ON" for a substantial portion of a frame capture period, pattern 1218 appears to be always projected to a user. It will be appreciated that selection of a single line horizontal aiming pattern 1218 (as opposed to a two dimensional pattern) in connection with an image sensor reader having overlapping frame exposure periods and line by line frame capture simplifies the task of controlling aiming LEDs 18 to project a visible pattern 1218 without light from the LEDs 18 affecting image signals generated by image sensor 32.

For comparison, a control circuit 140 operating according to a normal decode mode in which the control circuit 140 is optimized for decoding a symbology of an unknown type (1D or 2D) is described with reference to FIG. 5d. In the embodiment described with reference to FIG. 5d, illumination LEDs 16 are selectively turned "ON" during exposure periods $EXP_N$, $EXP_{N+1}$, $EXP_{N+2}$, while aiming LEDs 18 are selectively turned "ON" intermediate of the exposure periods $EXP_N$, $EXP_{N+1}$, $EXP_{N+2}$. As alluded previously, illumination LEDs 16 and aiming LEDs 18 can be repeatedly pulsed "ON" and "OFF". Thus, referring to FIG. 5b illumination LEDs 16 can be rapidly pulsed "ON" and "OFF" during a frame exposure period, $EXP_N$, $EXP_{N+1}$ as suggested by high-speed control pulses 1516. Likewise, aiming LEDs 18 can be rapidly pulsed "ON" and "OFF", as is suggested by high speed control pulses 1518 as shown in the timing diagram 401 of FIG. 5b.

Figure 3E:
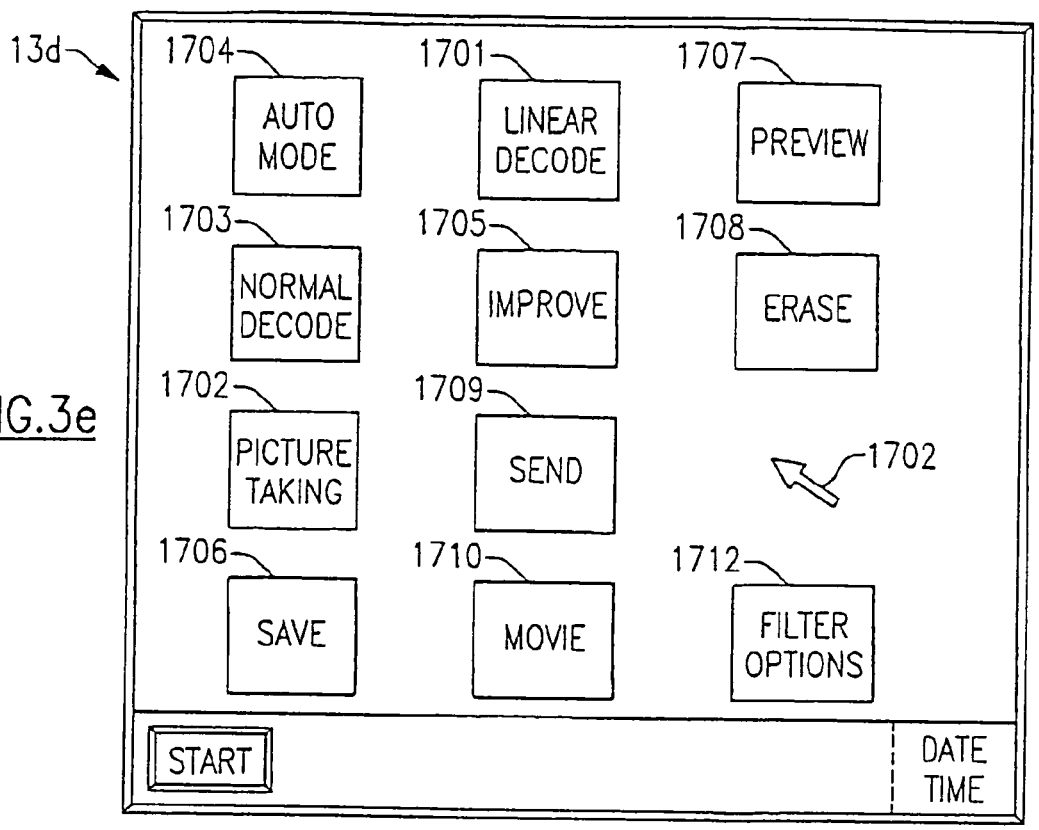
FIGS. 3e and 3f show a graphical user interfaces which may be utilized in the selection of an operating mode.
Figure 7:
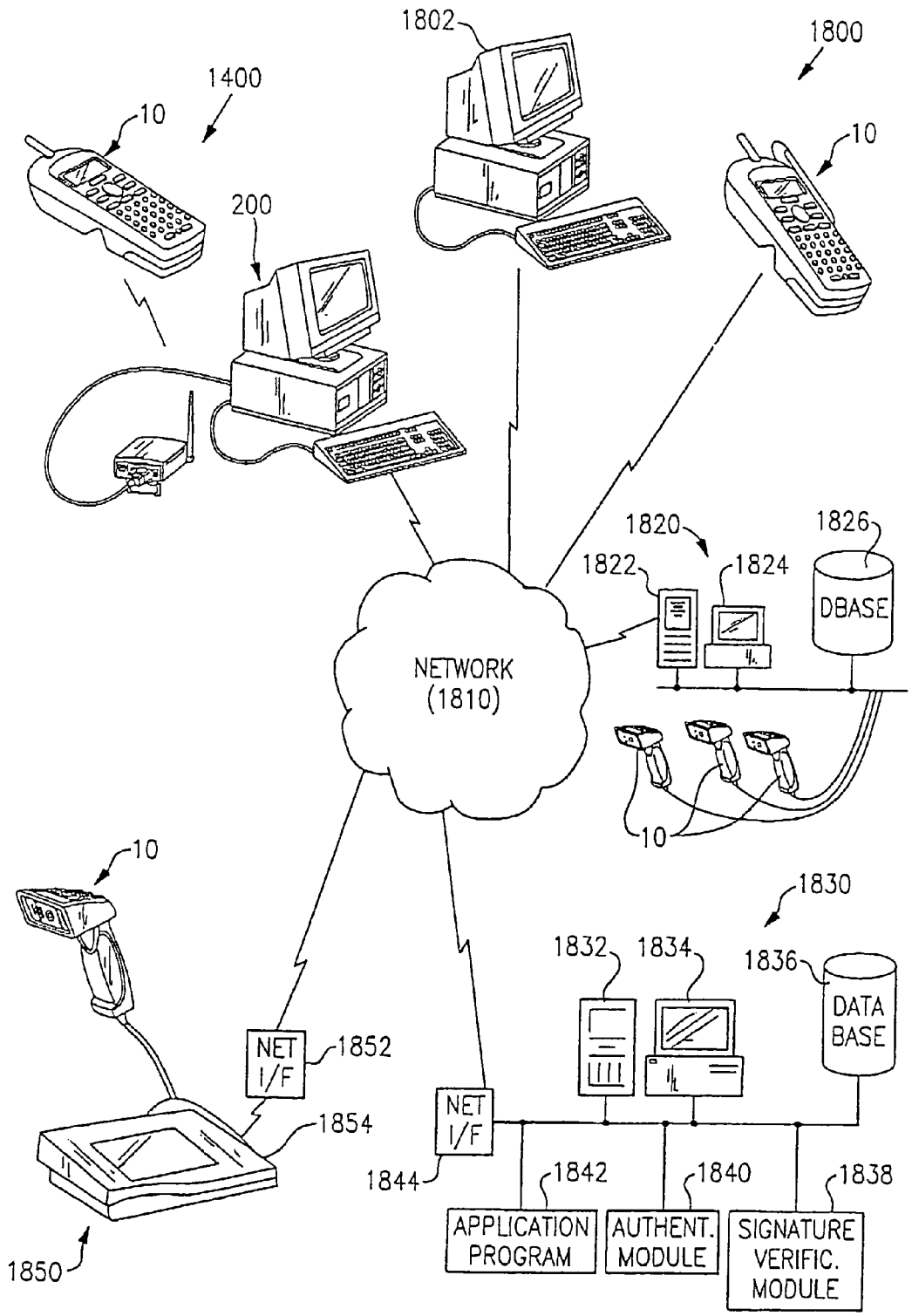
FIG. 7 illustrates an optical reader network according to the invention.

Reader 10 can be configured to be driven into a linear decode mode by selection of a menu-displayed icon 1701 as shown in FIG. 3e. The icon 1701 can be selected by "pointing and clicking" using a mouse, trackball, joystick or other pointer to move arrow 1702. Icon 1701 can be selected by applying pressure to icon 1701 if display 13 is a touch screen display having an associated touch screen overlay. Reader 10 can be configured to be driven into a linear decode mode with use of another menu interface. For example, reader 10 can be configured to commence operation in a linear decode mode on the selection of an appropriate key of a keyboard 13k. Reader 10 can also be driven into the linear decode mode by reading a reprogramming "menu symbol" as described in U.S. Pat. No. 5,929,418, issued Jul. 27, 1999, entitled, "Optical Reader Having Improved Menuing Features," incorporated by reference. The selection of the linear decode mode may also be made remotely by input of a command into a nonintegrated host computer (e.g., a GUI or keyboard of a host 200, 1802, 1824, 1834, as shown in FIG. 7).

In one embodiment of a linear decode mode, the linear decode mode is not ceased until a user manually selects another operating mode. In another embodiment, reader 10 is configured on selection of the linear decode operating mode to operate in a linear decode mode, and then automatically switch to a normal decode mode of operation if a decode attempt fails subsequent to a trigger signal being turned "ON". In another embodiment, reader 10 is configured, on selection of a linear decode mode to operate in a linear decode mode, and then automatically switch to a normal decode mode of operation if there is no successful decoding of a symbol, a predetermined time subsequent to a trigger signal being turned "ON". The predetermined time may be calculated based on the frame rate. That is, the predetermined time may be considered to have elapsed if after Y frames have been captured and subjected to a decode attempt, and decoding is still not successful. Trigger signals can be caused to change state on the actuation of trigger 13t. Trigger signals can also be caused to change state to an "ON" state automatically on the sensing of features in image data as explained in U.S. patent application Ser. No. 09/432,282, filed Nov. 2, 1999, entitled "Indicia Sensor System For Optical Reader," incorporated by reference. Trigger signals can also be caused to change state to an "ON" state by communication from a nonintegrated processor system M as explained in U.S. patent application Ser. No. 09/385,597, filed Aug. 30, 1999, entitled, "Optical Reader System Comprising Local Host Processor And Optical Reader."

An embodiment of the invention wherein control circuit 140 is configured to operate in a picture taking mode and in a decode mode, is described with reference to FIGS. 6a and 6b. The inventors observed that it may be desirable to differentiate between camera control parameters used for picture taking and camera control parameters used for decoding. For picture taking, for example, the speed with which an image is taken is generally not an important consideration. Therefore, a long exposure period can be used with less artificial light. For decoding, speed of image capture is often critical. Users of optical readers demand that the readers they use decode decodable symbols quickly. Therefore, decoding is generally enhanced with use of substantial artificial light and shorter exposure periods.

Figure 6A:
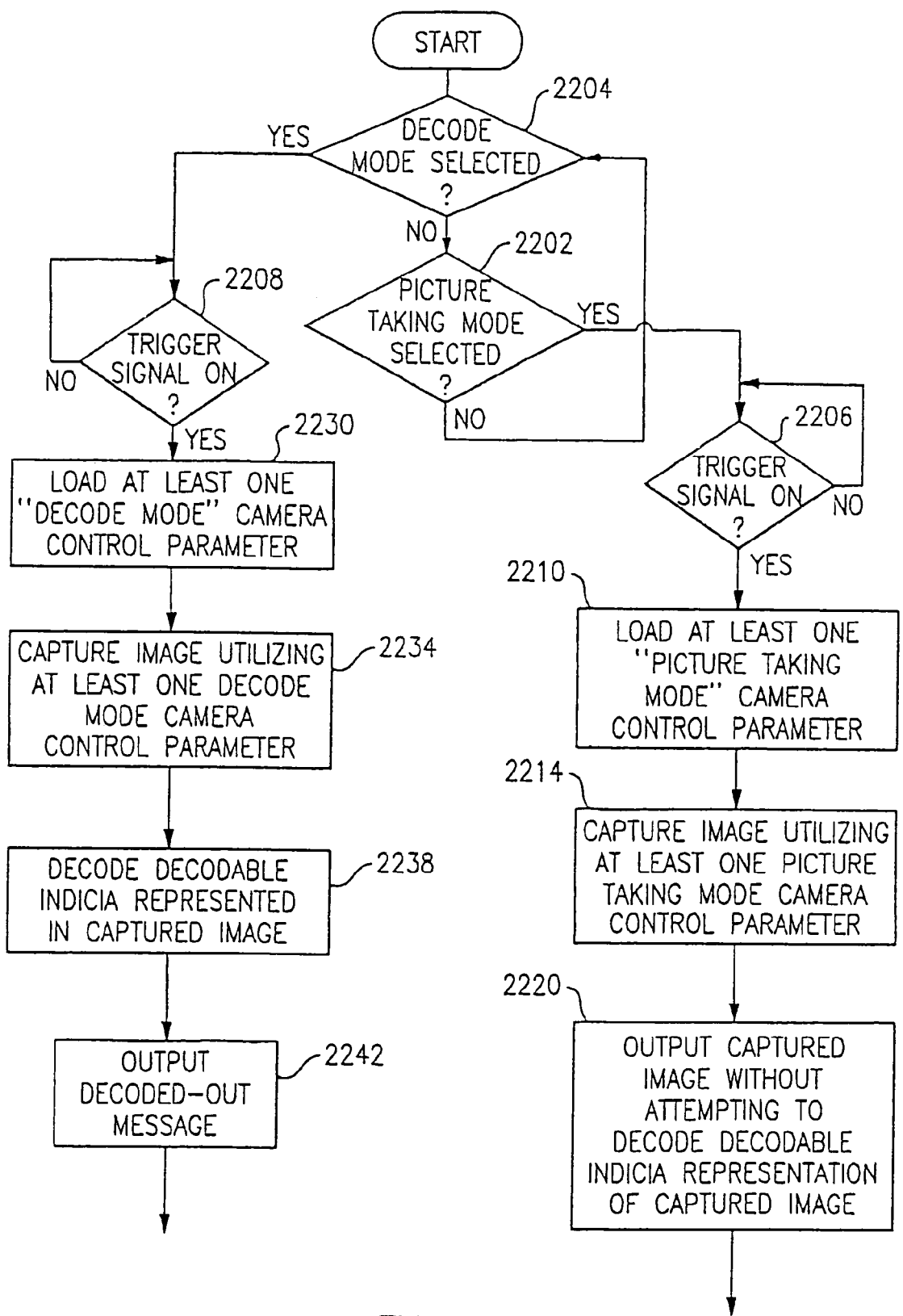
FIGS. 6a-6e are flow diagrams illustrating various operating modes according to the invention.

Referring to the flow diagram of FIG. 6a, a mode selection of one a picture taking mode at block 2202 or decode mode at block 2204 causes branching to one of blocks 2206, 2208, in which control circuit waits for a trigger signal to change to an "ON" state (trigger signals can be caused to switch to an "ON" state manually, manually remotely, or automatically as described previously). At block 2210 control circuit 140 loads a camera control parameter.

The "loading a camera control parameter" step as described herein can be accomplished using any one of a number of known programming methods. A program executed by control circuit 140 can have a "parameter table" storing a plurality of parameter values and the program may call one or more parameters of the parameter table at a specific point of a program execution. The loading of a camera control parameter step can be accomplished by changing one or more values of a program's parameter table. The loading of a camera control parameter step can also be accomplished by changing a destination of one or more program pointers or by any other known programming method for generating a command to redirect program flow.

The at least one camera control parameter loaded at block 2210 may take on a variety of forms. The at least one camera control parameter may be (e.g., an exposure period value, a gain control value, an illumination level value (controlling current to LEDs 16, 18), a frame rate, an initial exposure period value, an initial gain value, an initial illumination level value (controlling current to LEDs 16, 18), or an initial frame rate). In one particular example of the invention, a parameter loaded at block 2210 is a parameter which establishes a zero illumination level generated by the aiming/illumination system of reader 5 during the course of the picture taking mode (a parameter which when read operates to cut off current to LEDs 16, 18). Photograph quality under certain circumstances may be enhanced when an image is captured with LEDs 16, 18 "OFF".

A parameter loaded at block 2210 may also be a variable of a formula used to adjust a characteristic of frame capture over the course of several frames as in the exposure period development method described in U.S. patent application Ser. No. 09/766,922, filed Jan. 22, 2001, entitled "Optical Reader Having Reduced Parameter Determination Delay," incorporated by reference. To illustrate an example of a formula variable type parameter which could be loaded at block 2210, the variable parameter could be a variable of the formula used to adjust characteristics of image capture over the course of several frames. In a specific example, a next frame's (Frame N) exposure period could be calculated based on a relationship between a target frame white value (which may be calculated using a sample pixel white value data), an observed frame white value, a previous frame's (Frame N-M, M1) exposure period and a variable, wherein the value of the variable depends on whether the picture taking mode or the decode mode is selected. The camera control parameter which is loaded at block 2210 may also comprise a series of instructions. For example, control circuit 140 at block 2210 may alter a program pointer or set up an appropriate call or other suitable command so that a dynamically linked library file (as .dll, .ocx or equivalent kinds of files) particular to the picture taking mode is installed. At block 2210, control circuit 140 may install a first dynamically linked library (DLL) file for execution of first algorithm for controlling (e.g., gain or exposure or illumination). At block 2230 (executed during the decode mode) control circuit 140 may install a second DLL for execution of a second algorithm for controlling (e.g., gain, exposure, illumination level), wherein the second algorithm includes a set of instructions different than the set of instructions of the first algorithm.

At block 2214, control circuit 140 captures a frame of image data utilizing the at least one camera control parameter loaded at block 2210. For example, if the at least one parameter loaded at block 2210 is the single parameter of a specific exposure period, control circuit 140 at block 2214 captures a frame of image data into RAM 142 utilizing the specific exposure period setting loaded at block 2210. It will be understood that capture block 2214 may actually include the capture of one or more "parameter determination" frames of image data which are captured for purposes of developing a frame of image data intended for output at block 2220.

Referring again to the flow diagram of FIG. 6a, control circuit 140 at block 2220 outputs a frame of image data captured at block 2214. Outputting a frame of image data at block 220 may be accomplished in a variety of useful ways. Control circuit 140 may display the captured image on display 13d, may send the image to a host 200 or network 1810 (FIG. 7), or may send the image to a printer for printing.

If the decode mode is selected at block 2204, control circuit 140 proceeds to block 2208 to wait for a trigger signal to change to an "ON" state as described previously. On the changing of a trigger signal to an "ON" state at block 2208, control circuit 140 loads at least one decode mode camera control parameter in the manner of the loading of the picture taking camera control parameters as described relative to block 2230. At block 2234, control circuit 140 captures a frame of image data into RAM 142 utilizing the at least one camera control parameter loaded at block 2230. As explained with reference to capture block 2214, the capture block 2234 may actually involve a series of frame capture steps including capturing of "parameter determination" frames of image data. At block 2238, control circuit 140 decodes a decodable symbol. As explained in U.S. Pat. No. 5,929,418, issued Jul. 27, 1999, entitled, "Optical Reader Having Improved Menuing Features," it is understood that the capture and decode steps 2234 and 2238 may comprise a series of frame captures and failed decode attempts until a decodable symbol represented in a captured frame of image data is successfully decoded. The decode algorithm launched at block 2238 may be a bar code decoding algorithm. Aspects of decoding algorithms for decoding various types of symbols are known and are publicly available. AIM, Inc., the Association for Automatic Identification and Data Capture Technologies, publishes bar code symbology standards and notices. Various bar code standards are available from the AIM, Inc. website, www.aimglobal.org. The symbol decoded at block 2238 in addition to being a bar code may be (e.g., a decodable character such as an OCR character or a fingerprint) Further aspects of decodable symbol decoding are described in the previously referenced U.S. patent application Ser. No. 09/904,697.

At block 2242, control circuit 140 outputs a decoded out message, typically in the form of a character string in the case the decoded symbol decoded at block 2238 is a bar code symbol. The outputting of the decoded out message may be accomplished by displaying a decoded out message on a display 13d and/or sending a decoded out message to a device (e.g., a host computer 200 or network 1810) external from reader 10.

An example of image capture block 2214 in which at least one "parameter determination" frame of image data is captured for parameter determination prior to a frame being captured for output is described with reference to the flow diagram of FIG. 6d.

Figure 6B:
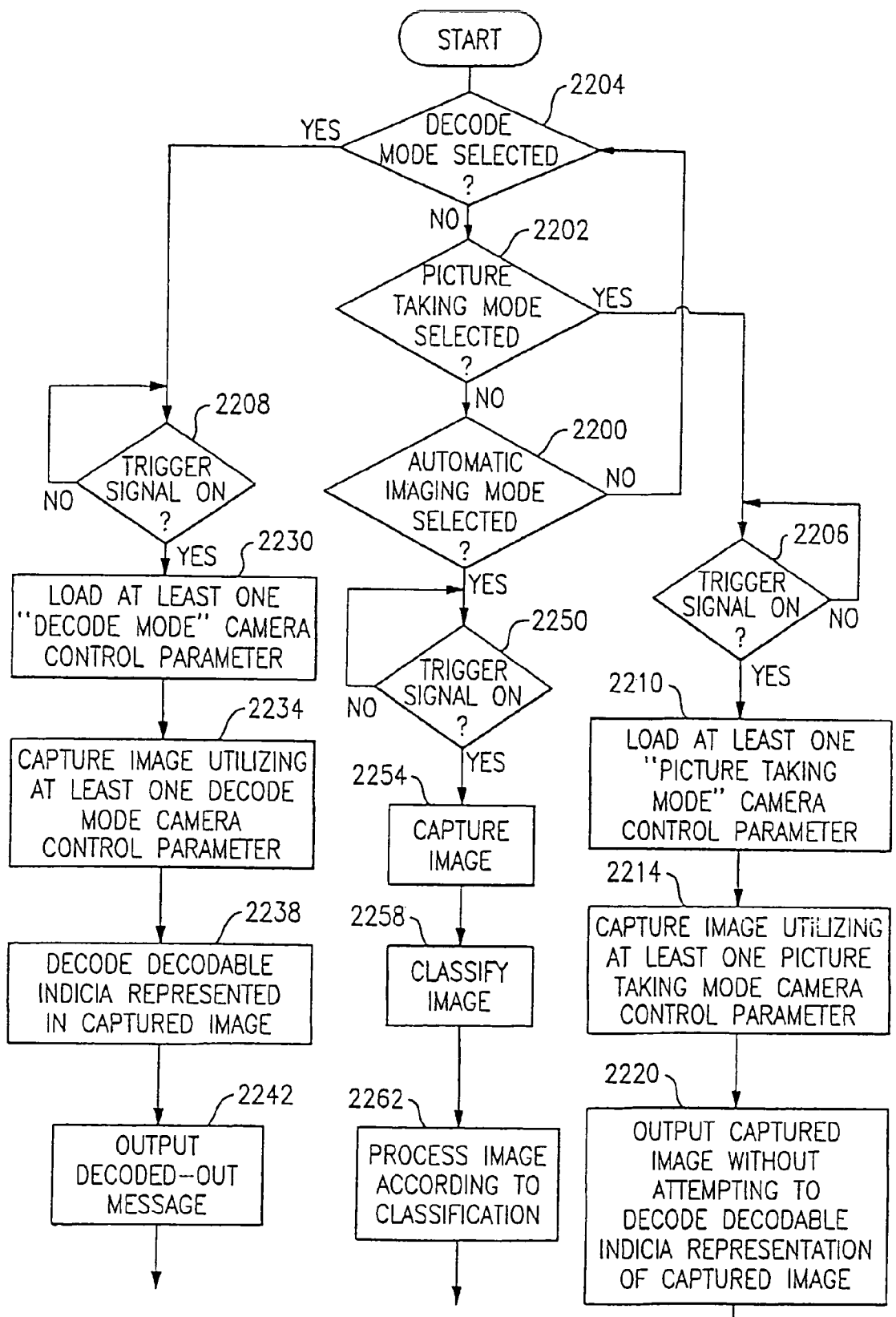
Figure 6C:
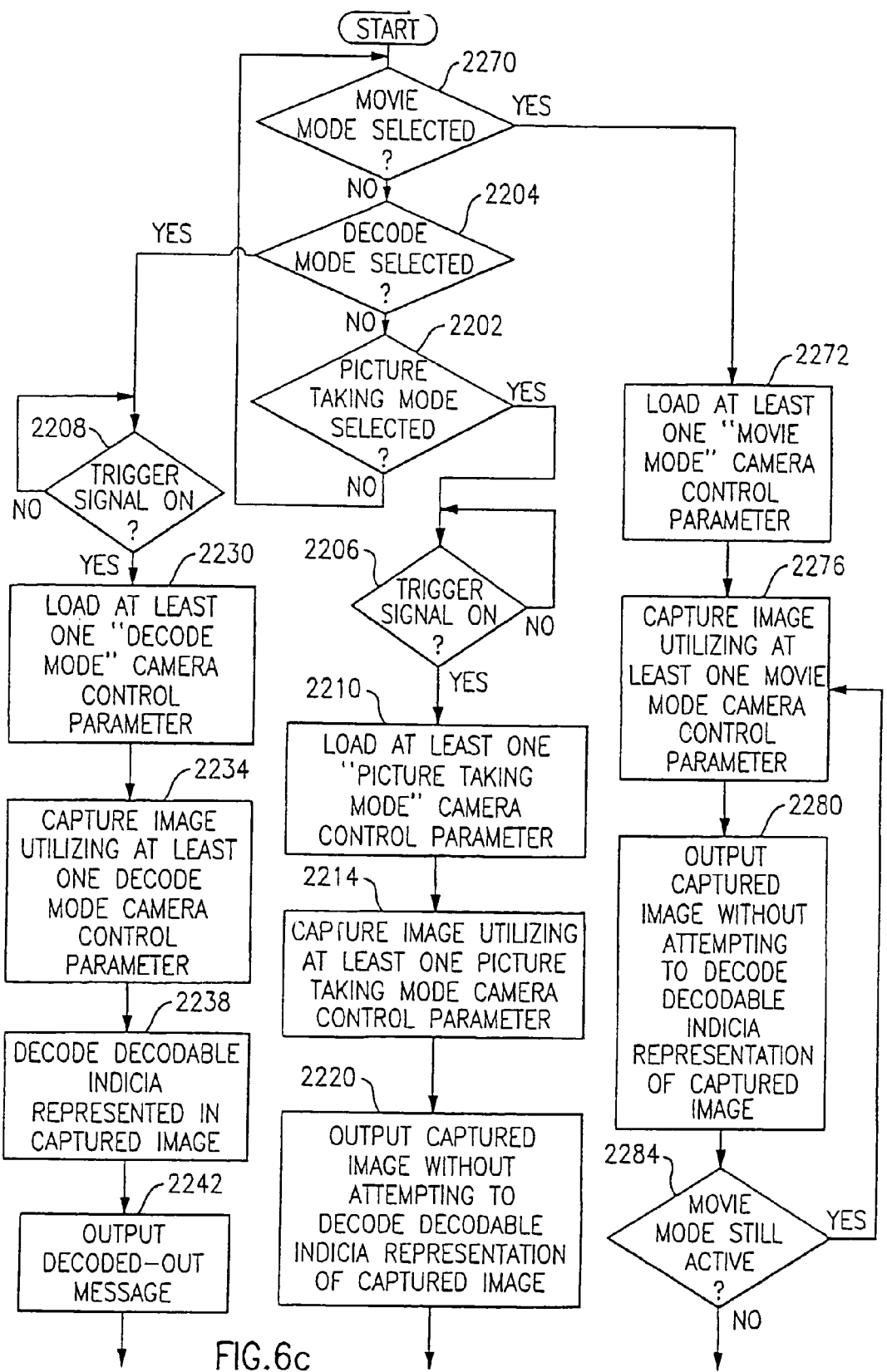
Figure 6D:
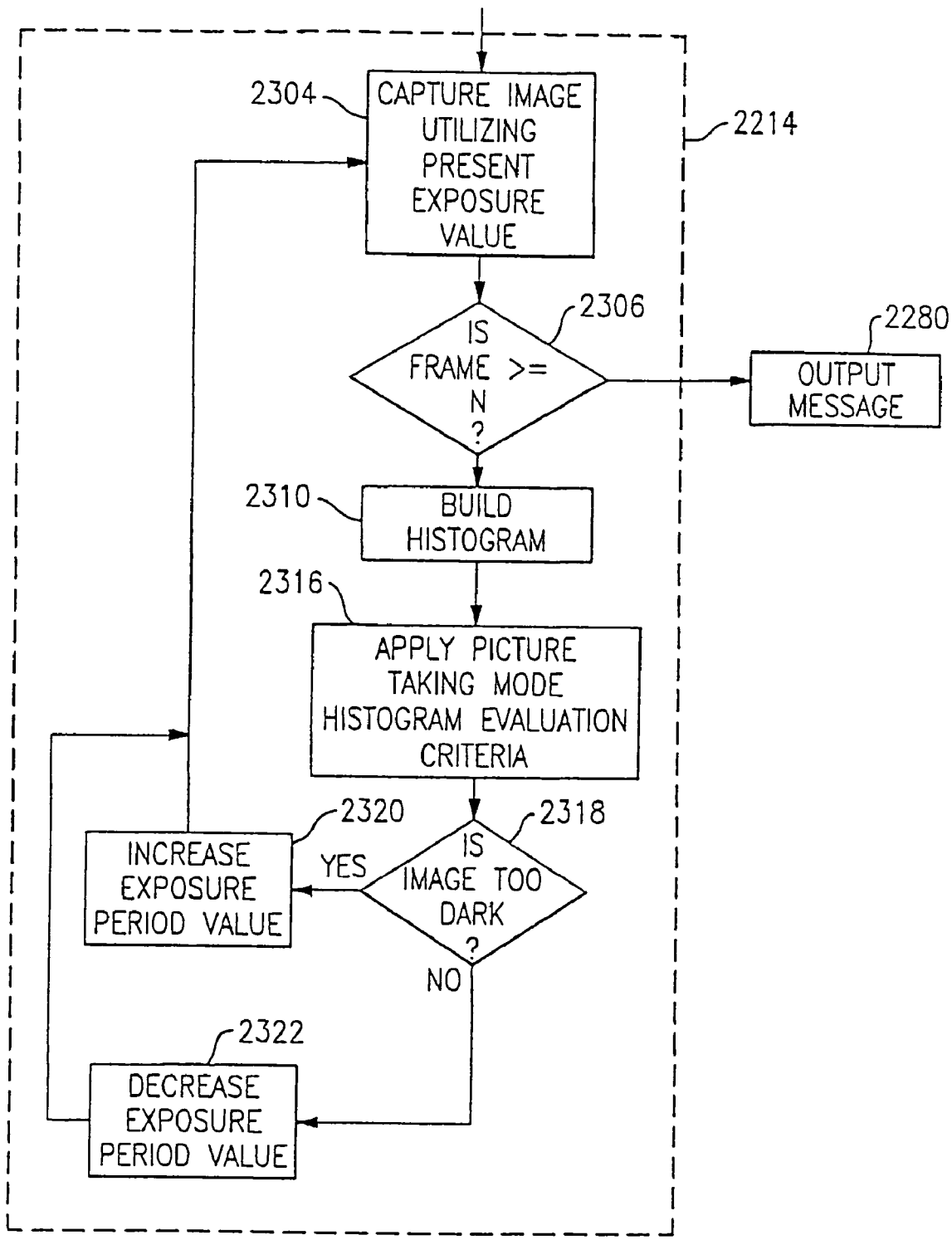

At block 2304, control circuit 140 captures a frame of image data utilizing a present exposure period value. If the frame captured at block 2304 is the first frame captured after reader 10 is driven into a picture taking mode, then the exposure period value may be an initial exposure period value loaded at block 2210 and selected to yield an image of high visual quality (another picture taking mode imaging input such as gain or illumination level could also or in the alternative be applied at block 2304). At block 2306, control circuit 140 determines if the last captured frame is to be output. For example, reader 10 can be set up so that a second, third or Nth frame is output after the previous frames are processed for parameter determination. In certain imaging systems, a parameter derived by analysis of captured image data is not available for input until after a plurality of frames have been captured. At block 2310, control circuit 140 builds a histogram summarizing the image data of the frame. A captured frame of image data typically comprises a plurality of gray scale pixel values. Generally a sample of pixel values are sampled from a full frame for purposes of generating a histogram. Alternatively, a partial frame of image data can be captured as described in copending application Ser. Nos. 09/766,806, filed Jan. 22, 2001, entitled "Optical Reader Having Partial Frame Operating Mode" and 09/766,922, filed Jan. 22, 2001, entitled "Optical Reader Having Reduced Parameter Termination Delay," incorporated by reference. A histogram corresponding to a picture of a typical visual nature (that is, not a typical decodable symbol) may take to form of picture taking mode histogram 2502 of FIG. 6f. Histogram 2502, if corresponding to a typical visual display image, may comprise substantially an even count of pixels at each gray scale value (0-255 in an 8 bit gray scale) throughout the range of possible gray scale values.

At block 2316, control circuit 140 evaluates picture taking mode histogram 2502 according to a picture taking mode histogram evaluation criteria. The inventors found that captured images have a high visual observation quality if image capturing inputs (exposure period, gain, illumination level) are controlled so that a median gray scale value of an image is at about a predetermined gray scale value, preferably a gray scale value in the middle (e.g., a gray scale value from about 55 to about 200) of the gray scale. In the specific example of FIG. 6f, histogram 2502 is evaluated to determine whether the median gray scale value of histogram is above or below the predetermined middle range gray scale value of 150. In other words, the median gray scale value of the histogram 2502 is set to a set point. In order to achieve the set point, imaging inputs are controlled in accordance with the evaluation of the histogram evaluation block 2316. If the captured image is too dark (if the median gray scale value of histogram 2502 is less than 150), control circuit 140 at block 2320 increases an exposure period value. If the captured image is too light, control circuit 2322 at block 2322 decreases an exposure period value to lighten a subsequent image. The exposure period adjustment steps at block 2320, 2322 could be substituted for by another suitable image capturing input (e.g., gain, control or illumination level control).

Figure 6E:
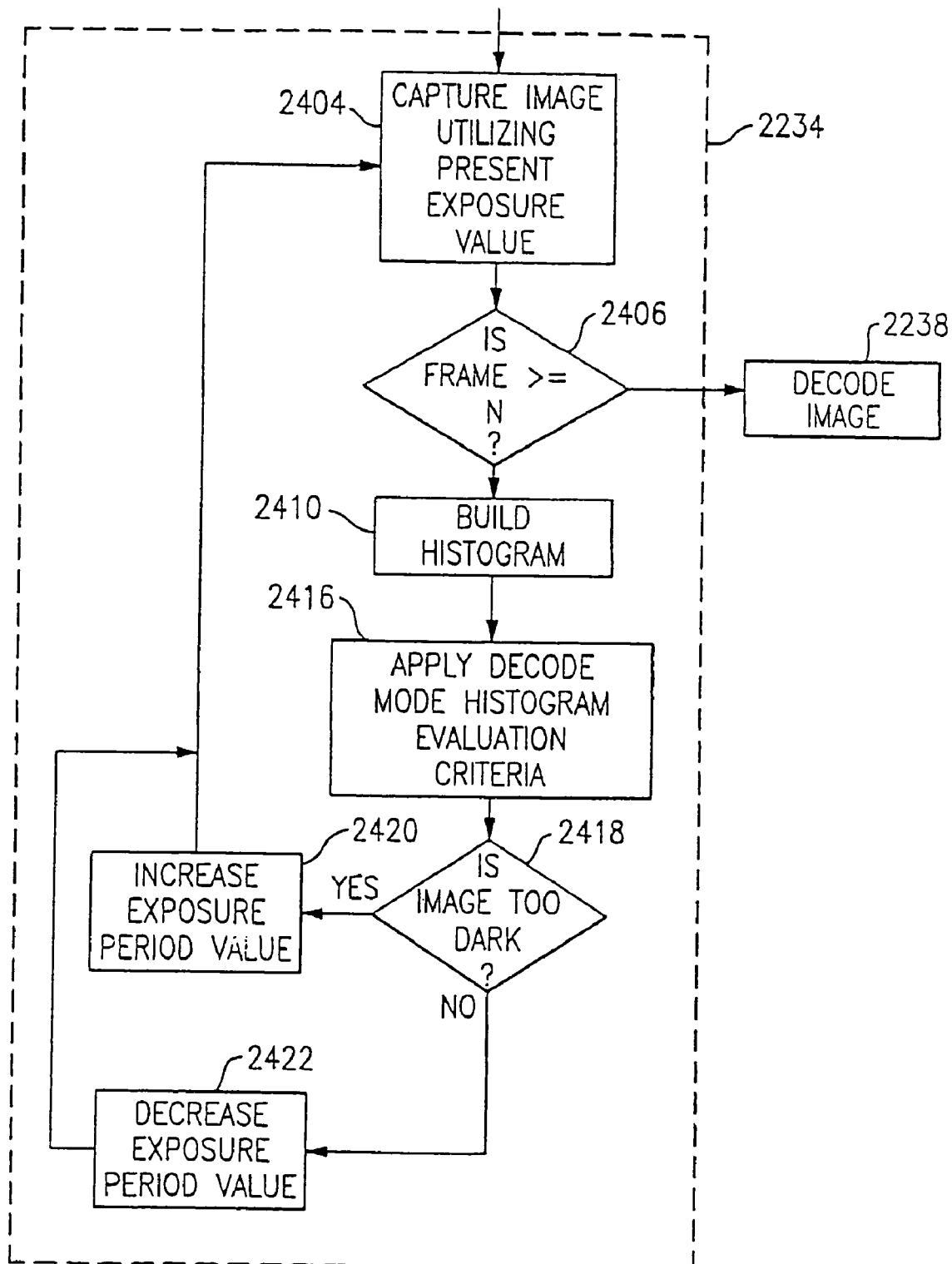
Figure 6F:
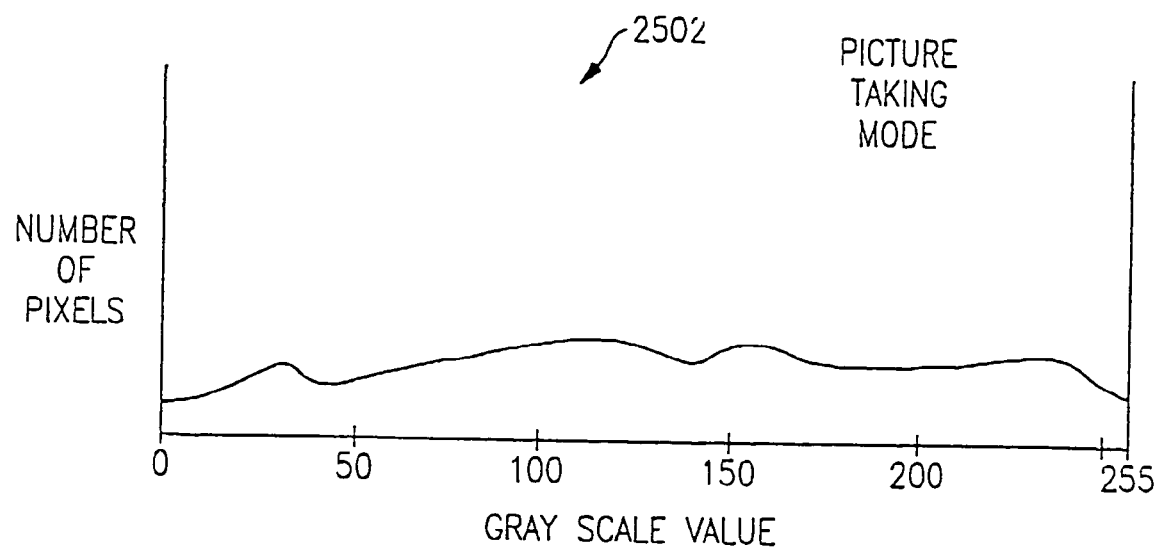
FIGS. 6f and 6g are histograms corresponding to captured frames of image data captured according to the invention.

In the flow diagram of FIG. 6e, an example of decode mode image capture block 2334 having a plurality of image capturing steps including parameter determination steps is described. The steps 2404, 2406, 2410, 2416, 2418, 2420, and 2422 of decode mode image capturing block 2234 of FIG. 6e are the same as the steps 2304, 2306, 2310, 2316, 2318, 2320, and 2322 described with reference to the flow diagram of FIG. 6d except for two points of distinction: first, the initial ($E_0$) decode mode exposure value period (or other initial imaging input) applied at the first execution of block 2404 is a value different than the initial ($E_0$) picture taking mode exposure period value applied at block 2304. In general, an initial exposure period in a picture taking mode is selected to be longer than an initial exposure period in a decode mode. The inventors found that for high quality visual display (display wherein represented objects can readily be discerned by the human eye), lighter images are preferred and that for decoding, darker and faster captured images can be utilized.

Figure 6G:
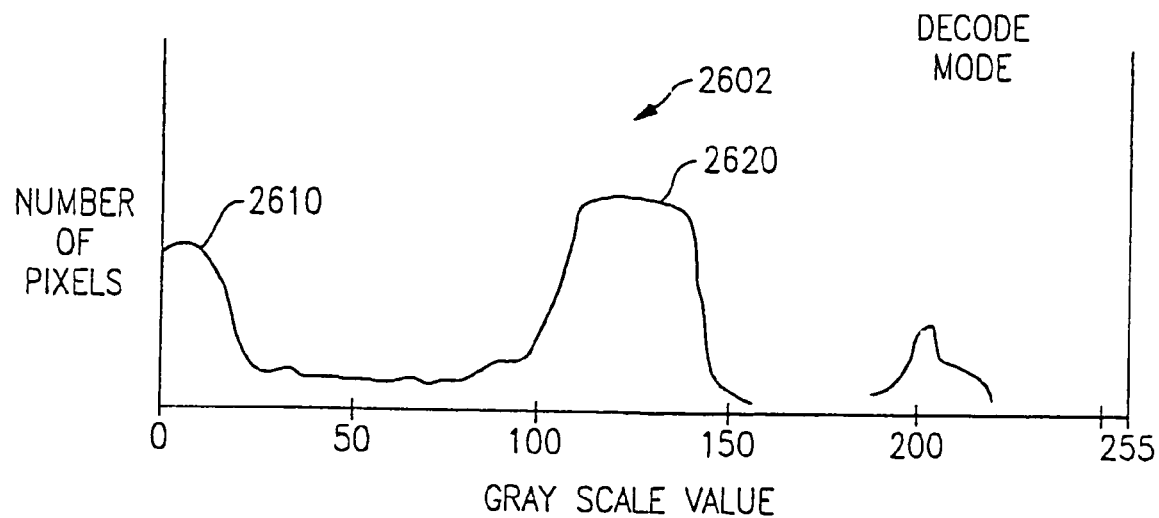

The second difference respecting the decode mode capture block 2234 as depicted in FIG. 6e and the picture taking mode image capture block 2214 as depicted in FIG. 6d is in relation to the application of histogram evaluation criteria (block 2416 as compared to block 2316). In a decode mode histogram evaluation block 2416 a different histogram evaluation criteria is applied than the criteria applied at picture taking mode histogram evaluation block 2316. A representation of histogram 2602 corresponding to an image of a black decodable symbol on a white substrate is shown on FIG. 6g. Histogram 2602 represents what may be considered a bi-tonal image. Histogram 2602 includes a high number of gray scale values at a dark pixel range, as indicated by dark peak 2610 and a high number of gray scale values at a light pixel range as is indicated by light peak 2620.

The inventors found that captured images are quickly obtained and readily decoded if image capturing inputs (exposure period, gain, illumination level) are controlled so that a predetermined near peak gray scale value of a histogram corresponding to an image is at about a predetermined gray scale value, preferably a gray scale value in the middle (e.g., a gray scale value from about 55 to about 200) of the gray scale. In the specific example of FIGS. 6e and 6f, histogram 2602 is evaluated to determine whether a predetermined 97% peak gray scale value of histogram 2602 (the gray scale value at which 3% of gray scale values are above and 97% below) is above or below the predetermined middle range gray scale value of 150. In other words, a predetermined near peak gray scale value of the histogram is set to a set point. In order to achieve the set point, imaging inputs are controlled in accordance with the evaluation at the histogram evaluation block 2416. If the captured image is too dark (if the 97% gray scale value of histogram 2602 is less than 150), control circuit 140 at block 2420 increases an exposure period value to brighten the image. If the captured image is too light, control circuit 140 at block 2422 decreases an exposure period value. The exposure period adjustment steps at blocks 2420, 2422 could be substituted for by another suitable image capturing input (e.g., gain, control or illumination level control). The use of a near peak value (e.g., 97%) at histogram evaluation block 2416 as opposed to a peak value (the highest gray scale value of the histogram) minimizes the impact that spuriously high light values (as might be caused by specular reflections) might otherwise have on the imaging input control system.

Referring now to the flow diagram of FIG. 6b an alternative embodiment of the invention is described. In the embodiment of FIG. 6b, control circuit 140 is operable as described in FIG. 6a except that control circuit 140 further includes an automatic imaging mode as indicated by block 2200. In an automatic imaging mode as described in previously referenced U.S. patent application Ser. No. 09/904,697, filed Jul. 13, 2001, entitled, "Optical Reader Having A Color Imager," an image is captured at block 2254 and subjected to classification by a classification circuit at block 2258. At block 2258, the image can be classified on the basis of whether the image includes a graphical symbol such as bar codes, text or OCR characters. High energy, (e.g., black-white transitions are a good indicator for the presence of a graphical symbol, such as a bar code symbol). Where image sensor 32 is a color image sensor, a black and white bi-tonal image will consist of green pixels that are in one of two possible value ranges. One narrow range of values is representative of white portions of the image, whereas the other narrow range of values is representative of black portions of the image. Where image sensor 32 is a monochrome image sensor, a black and white bi-tonal image will consist of pixel values that are within one of two ranges at the extremes of the gray scale. Further aspects of graphical symbol detection are described in greater detail in the previously referenced U.S. patent application Ser. No. 09/904,697, filed Jul. 13, 2001, entitled, "Optical Reader Having A Color Imager." In determining whether a captured frame of image includes a bitonal graphical symbol, control circuit 140 may evaluate whether a frame of image data includes pixel values in two distinguishable ranges of pixel values.

At block 2262, control circuit 140 processes the image captured at block 2254 in a manner that depends on the classification of the image at block 2258. For example, if at block 2258, control circuit 140 determines that the captured image does not include a graphical symbol, then control circuit 140 may, without attempting to decode decodable symbol, output the image in the manner described with reference to block 2220. If control circuit 140 at block 2258 determines that the image does in fact include a graphical symbol, control circuit 140 at block 2262 may attempt to decode a decodable symbol therein and output a decoded out message (e.g., display the message on a display or sent it to host 200 or network 1810).

If at block 2262, control circuit 140 determined that an image does not include a graphical symbol, control circuit 140 may in the alternative automatically jump to block 2210 to load at least one "picture taking mode" camera control parameter, and then automatically execute blocks 2214 and block 2220 as described previously to capture a subsequent frame of image data and to output the captured frame captioned at block 2214. If at block 2262, control circuit 140 determines that an image does, in fact, include a graphical symbol, control circuit 140 may automatically jump to block 2230 to load at least one decode mode camera control parameter as described previously and then automatically jump to block 2234 and then to block 2242 to decode a decodable symbol (block 2238) and then output a decoded output message corresponding to the symbol (block 2242).

Control circuit 140 may be driven into one of the picture taking, decode mode or automatic imaging modes by way of a user entering a command with use of one of an available menu interface, as described previously with reference to selection of the linear decode mode. The picture taking, decode, and automatic imaging modes may be selected (e.g., with use of a local or remote graphical user interface, with use of menu symbols, or by actuation of an appropriate key or a local or remote keyboard). With reference to FIG. 3e, a picture taking mode can be selected by actuation of icon 1702, a decode mode can be selected by actuation of decode mode icon 1701, 1703 an automatic imaging mode can be selected by actuation of icon 1704. Further, as will be described, "photograph improvement" mode of operation, which can be selected by actuation of icon 1705, or with use of another suitable menu interface (e.g., remote GUI, local or remote keyboard key, menu symbol) describer herein.

In another aspect of the invention, control circuit 140 may operate in a "photograph improvement" mode of operation. In a photograph improvement mode, control circuit 140 improves a visual output quality (display or print) of a last captured image captured by control circuit 140. A last captured image is typically stored in a last frame buffer memory location 144 of RAM 142. Further as part of a photograph improvement mode of operation, control circuit 140 may output a frame of image data that has been subjected to improvement. In another embodiment of a photograph improvement mode, control circuit 140 improves a visual output quality of a currently displayed image displayed on display.

Decode mode camera control parameters, which may be loaded at block 2230, when utilized by control circuit 140 during image capture often result in the capture of an image which is of high quality for decoding purposes but of poor quality for visual display purposes. Further, in common embodiments, imaging lens assembly 40 often includes fixed short range optics which optimizes reader for short range symbol reading but do not optimize the reader for picture taking. Accordingly, it is highly useful to manually drive reader 10 into an improvement mode after the reader has captured an image in accordance with a decode mode of operation. It is also often useful to drive reader 10 into an improvement mode of operation after the reader has captured an image during the course of operating in a picture taking mode of operation, especially given that, as mentioned, reader 10 is often not optimized for long range (e.g., several feet) picture taking.

The reader 10 may be driven into an improvement mode by user selection via a menu interface of the type described previously (e.g., manual reader keyboard 13k, manual reader GUI displayed on display 13d, remote (host) GUI, remote keyboard, menu symbol. Reader 10 may also be driven into an improvement mode automatically. For example, the improvement mode may be executed automatically as part of the picture taking mode described previously with reference to the flow of diagrams of FIGS. 6a and 6b. That is, output block 2220 may be replaced by execution of an improvement mode in which control circuit 140 improves a visual output quality of an image prior to outputting the image.

Control circuit 140 may improve a visual output quality of an image in a number of different ways. For example, in the case of a monochrome image, control circuit 140 may improve a visual output quality of an image by reducing the contrast of the image (e.g., by reducing each light pixel value by predetermined or dynamical scale levels). When operating in a decode mode, control circuit 140 in a typical embodiment attempts to capture an image having high contrast (e.g., dark areas are represented at the low end of the gray scale and light areas are represented at the high end of the gray scale). However, a high contrast image is often not preferred for visual output purposes. Accordingly, a visual output quality of a captured frame subjected to decoding can often be improved by reducing a gray scale value of pixel values of the image that are at the high end of the gray scale and by increasing a gray scale value of pixel values at the lower end of the gray scale.

In a "save" mode of operation, selectable by actuation of icon 1706, control circuit 140 saves a last captured image to a frame storage location. RAM 142 and/or another memory device such as flash memory 120 may have defined therein M number of frame storage locations. The frame stored within buffer 144 may be copied or transferred into one of the M frame storage locations each time the save button 1706 is activated.

In a "preview mode" selectable by actuation of icon 170, one or more frames stored in the M frame storage locations are displayed for observation. Display 13d can display one or more previously captured and stored frames at a given time. If a displayed frame displayed during a preview mode is of poor visual quality, a user may select a photograph improvement mode by actuation of icon 1705 to improve the visual output quality of the frame. When an erase mode is selected by actuation of icon 1708, the display image is removed from a memory 142,120. When a "send mode" is selected by actuation of icon 1709, the presently displayed frame is sent to a remote device (e.g., host 200, network 1810).

By selection of icon 1710, or by input into another suitable menu interface as described herein, reader operates in a "movie mode". A "movie mode" of operation is described with reference to the flow diagram of FIG. 6c. When a movie mode is selected at block 227, control circuit 140 proceeds to block 2272 to load a movie mode camera control parameter, which may be (e.g., and exposure period, a gain, an illumination level, a frame rate, an initial exposure period, an initial gain, an initial illumination level, an initial frame rate, a variable in a formula or a set of instructions). A "movie mode camera control parameter" as described herein is one which, when processed by control circuit 140 results in an image being captured that is optimized for visual display quality when the frame is one frame out of a series of continuously displayed frames. At block 2276, control circuit 140 captures an image utilizing at least one movie mode camera control parameter loaded at block 2272. At block 2280, control circuit 140 outputs the frame captured at block 2276, typically by displaying the image on display 13d of reader 10. If control circuit 140 determines at block 2284 that the movie mode is still active, control circuit 140 reverts to block 2276 to capture another frame of image data utilizing the at least one movie mode camera control parameter, and then again to block 228 to display the captured image. The process of capturing and displaying images continues until the movie mode is deactivated. The continuous capture and display of new images on display results in a motion picture or "movie" being displayed on display 13d. The series of continuous images displayed on display 13d during a movie mode may be referred to a streaming video image.

In the specific embodiment of FIG. 6c, the capturing of frames of image data commences automatically after operation in the movie mode is selected (i.e., automatically after icon 1710 is actuated) without there first being a change of state of a trigger signal. Control circuit 140 can be configured so that a movie mode is deactivated when a trigger signal is turned "ON." For example, control signal 140 can be configured so that when a first trigger button 13t-1 (FIG. 1e) is actuated, control circuit 140 automatically jumps to block 2230 from decision block 2284 to automatically load a decode mode parameter, capture an image utilizing the decode mode parameter, and decode a decodable symbol represented the captured frame. Control circuit 140 can also be configured so that when second trigger button 13t-2 (FIG. 1e) is actuated, control circuit 140 automatically jumps from decision block 2284 to block 2210 to automatically load a picture taking mode camera control parameter and to block 2214 and 2220 to capture and output a frame of image data utilizing the camera control parameter. It is seen that actuation of a movie mode enables locating of a target decodable symbol or area to be subjected to image capture. When the movie mode is actuated, a frame of image data substantially corresponding to the present field of view of reader 10 will be displayed. By actuation of the movie mode a user can manipulate reader 10 into such location that a representation of the area intended to be the subject of a decode attempt or a picture taking is displayed on display 13d.

Figure 3F:
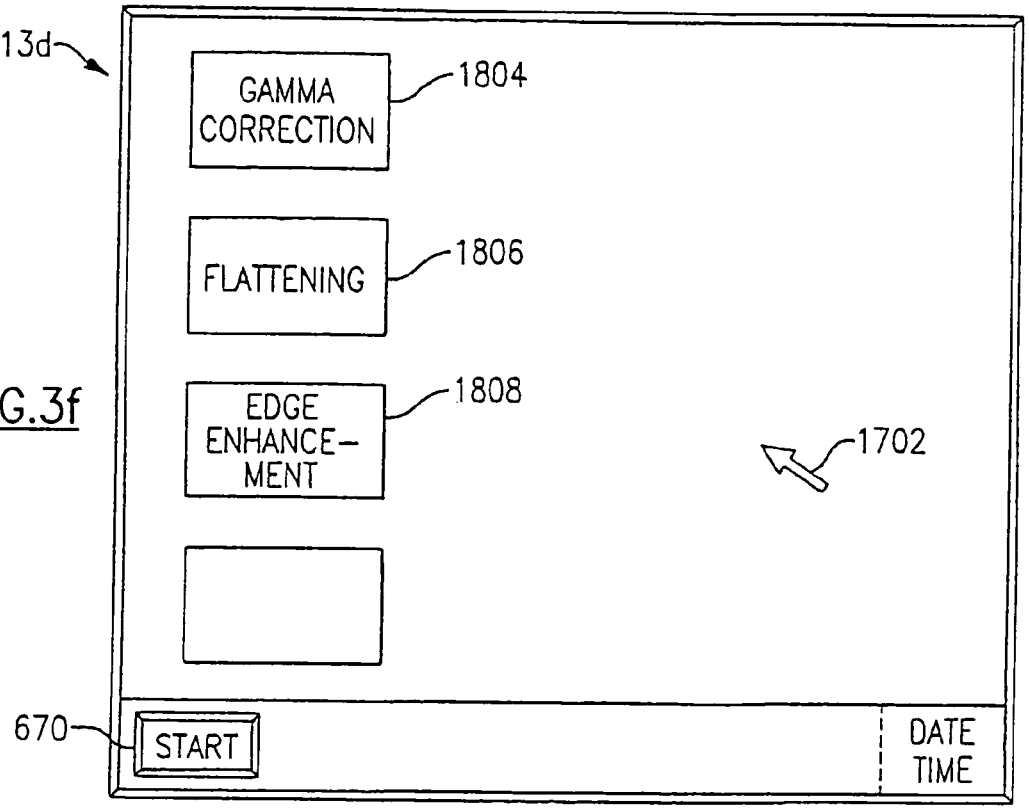

In another aspect of the invention, control circuit 140 may display on display 14d a filter option menu screen as indicated by FIG. 3f. Control circuit 140 may be caused to display the filter option screen menu screen of FIG. 3f by selection of filter options icon 1712 of the menu screen of FIG. 3e. Alternatively, filter selection icons 1804, 1806 and 1806 could be displayed on the menu option screen of FIG. 3e. The filter option menu screen of FIG. 3e presents a user with various options for processing an image to be captured. When gamma correction icon 1804 is selected, a next captured image captured by reader 10 (whether captured in a decode mode or in a picture taking mode) is subject to gamma correction. When flatting icon 1806 is selected, a next captured image captured by reader 10 is subject to image flattening (for correction of distortion owing to the cosine effect). When edge enhancement icon 1808 is selected, a next captured image captured by reader 10 is subject to edge enhancement.

As embodied herein and depicted in FIG. 7, an example of an optical reader network 1800 in accordance with the present invention is disclosed. Network 1800 includes wireless system 1400, personal computer 1802, optical reader 10, LAN 1820, network servicing center 1830, and personal area network (PAN) coupled together via network 1810.

One of ordinary skill in the art will recognize that network 1810 may be of any suitable type depending on the application, but there is shown by way of example the Internet. However, the present invention should not be construed as being limited to this example. In another embodiment, network 1810 is a private network. Those of ordinary skill in the art will also recognize that network 1810 is a wire line network in one embodiment, and a wireless network in another embodiment. Network 1810 may include circuit switched networks, IP networks, or both.

LAN 1820 includes server 1822, computer 1824, database 1826, and a plurality of optical readers 10. Database 1826 is used to store associated images along with other data fields. One may want to associate the delivery means, route, driver, and other related information for subsequent analysis. Network 1810 allows reader 10, PAN 1850, and wireless system 1400 a way to store such data in database 1826. System analysts can access this information via personal computer 1802 connected to network 1810. In one embodiment, LAN 1820 includes an Internet website. In this embodiment, users are authenticated before gaining access to database 1826.

Network servicing center 1830 is coupled to network 1810 via interface 1844. Center 1830 also includes server 1832, computer 1834, database 1836, signature verification module 1838, authentication module 1840, coupled together via a LAN. Center 1830 accommodates any number of useful applications programs 1842.

PAN 1850 includes at least one color optical reader 10 coupled to point-of-sale (POS) terminal 1854. POS terminal 1854 is coupled to network 1810 via interface 182. POS terminal 1854 includes a credit card reader and a signature capture block. In the scenario depicted in FIG. 7, a merchant user of POS terminal 1854 transmits an associated customer credit card number, signature, and in one embodiment, a color image of the customer, to center 1830. Authentication module 1840 is used to authenticate the credit card and signature verification module is used to authenticate the signature. In another embodiment, database 1836 is used to store the customer's image, credit card number, and signature for verification purposes.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A bar code reader comprising:
    an image sensor;
    a control circuit in communication with said image sensor and controlling said image sensor to include first and second frame exposure periods, said first and second frame exposure periods being overlapping such that said second frame exposure period commences prior to a time that said first frame exposure period terminates;
    at least one illumination light source for use in projecting an illumination pattern;
    at least one aiming light source for use in projecting an aiming pattern,
    wherein said control circuit in at least one operating mode coordinates control of said at least one aiming light source so that said at least one aiming light source is turned ON during said first frame exposure period while being selectively turned OFF during a portion of said first frame exposure period at which time pixels of said image sensor corresponding to said aiming pattern are being exposed, wherein said control circuit further in said at least one operating mode coordinates control of said at least one aiming light source so that said at least one one aiming light source is turned ON during said second frame exposure period while being selectively turned OFF during a portion of said second frame exposure period at which time pixels of said image sensor corresponding to said aiming pattern are being exposed.

2. The bar code reader of claim 1, wherein said image sensor is CMOS image sensor.

3. The bar code reader of claim 1, wherein said aiming pattern is single horizontal line aiming pattern.

4. The bar code reader of claim 1, wherein said control circuit is operable in a user-selectable linear decode mode and wherein said at least one operating mode is a user selectable normal operating mode, wherein said control circuit in said linear decode mode maintains said at least one illumination light source OFF and said at least one aiming light source selectively ON while pixels corresponding to said aiming pattern are being exposed, and wherein said control circuit in said normal operating mode selectively turns said at least one aiming light source OFF while pixels of said image sensor corresponding to said aiming pattern are being exposed.

5. The bar code reader of claim 1, wherein said bar code reader is adapted so that said illumination pattern when projected is projected over a first area, and is further adapted so that said aiming pattern, when projected, is projected over a second area, the second area being smaller than said first and further being an area smaller than an area represented by a frame of image data captured by said bar code reader when said bar code reader is operated to capture a full frame of image data.

6. A portable bar code reading apparatus comprising:
    an image sensor;
    a lens assembly;
    wherein said portable bar code reading apparatus is configured to control said image sensor to include first and second frame exposure periods, said first and second frame exposure periods being overlapping such that said second frame exposure period commences prior to a time that said first frame exposure period terminates;
    at least one illumination light source for use in projecting an illumination pattern;
    at least one aiming light source for use in projecting an aiming pattern,
    wherein said portable bar code reading apparatus in at least one operating mode coordinates control of said at least one aiming light source so that said at least one aiming light source is ON during said first frame exposure period while being selectively turned OFF during a portion of said first frame exposure period at which time pixels of said image sensor corresponding to said aiming pattern are being exposed, wherein said portable bar code reading apparatus further in said at least one operating mode coordinates control of said at least one aiming light source so that said at least one aiming light source is turned ON during said second frame exposure period while being selectively turned OFF during a portion of said second frame exposure period at which time pixels of said image sensor corresponding to said aiming pattern are being exposed.

7. The portable bar code reading apparatus of claim 6, wherein said image sensor is CMOS image sensor.

8. The portable bar code reading apparatus of claim 6, wherein said aiming pattern is single horizontal line aiming pattern.

9. The portable bar code reading apparatus of claim 6, wherein said portable bar code reading apparatus is operable in a user-selectable linear decode mode and wherein said at least one operating mode is a user selectable normal operating mode, wherein said portable bar code reading apparatus in said linear decode mode maintains said at least one illumination light source OFF and said at least one aiming light source selectively ON while pixels corresponding to said aiming pattern are being exposed, and wherein said portable bar code reading apparatus in said normal operating mode selectively turns said at least one aiming light source OFF while pixels of said image sensor corresponding to said aiming pattern are being exposed.

10. A portable bar code reading apparatus comprising:
an image sensor;
a lens assembly;
wherein said portable bar code reading apparatus is configured to control said image sensor to include first and second frame exposure periods, said first and second frame exposure periods being overlapping such that said second frame exposure period commences prior to a time that said first frame exposure period terminates;
a first pattern light source for use in projecting a first light pattern over a first area;
a second pattern light source for use in projecting a second light pattern over a second area, the second area being smaller than said first area, the portable bar code reading apparatus being configured so that said first light pattern can be projected without said second light pattern being projected and further being configured so that said second light pattern can be projected without said first light pattern being projected,
wherein said portable bar code reading apparatus in at least one operating mode coordinates control of said second pattern light source so that said first pattern light source is ON during said first frame exposure period while being selectively turned OFF during a portion of said first frame exposure period at which time pixels of said image sensor corresponding to said second light pattern are being exposed, wherein said portable bar code reading apparatus further in said at least one operating mode coordinates control of said second pattern light source so that said second pattern light source is turned ON during said second frame exposure period while being selectively turned OFF during a portion of said second frame exposure period at which time pixels of said image sensor corresponding to said second light pattern are being exposed.

11. The portable bar code reading apparatus of claim 10, wherein said image sensor is CMOS image sensor.

12. The portable bar code reading apparatus of claim 10, wherein said second light pattern is single horizontal line pattern.

13. The portable bar code reading apparatus of claim 10, wherein said second light pattern defines a single contiguous shape.

14. The portable bar code reading apparatus of claim 10, wherein said portable bar code reading apparatus is operable in a user-selectable linear decode mode and wherein said at least one operating mode is a user selectable normal operating mode, wherein said portable bar code reading apparatus in said linear decode mode maintains said first pattern light source OFF and said second light pattern light source selectively ON while pixels corresponding to said aiming pattern are being exposed, and wherein said portable bar code reading apparatus in said normal operating mode selectively turns said second pattern light source OFF while pixels of said image sensor corresponding to said second light pattern are being exposed.

15. The portable bar code reading apparatus of claim 10, wherein said portable bar code reading apparatus when controlling said second pattern light source to be ON flickers said second pattern light source.

16. The portable bar code reading apparatus of claim 10, wherein said second area is within said first area.

* * * * *

UNITED STATES PATENT AND TRADEMARK OFFICE
CERTIFICATE OF CORRECTION

PATENT NO. : 7,637,430 B2 Page 1 of 1
APPLICATION NO. : 10/842851
DATED : December 29, 2009
INVENTOR(S) : Hawley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 492 days.

Signed and Sealed this

Twenty-first Day of December, 2010

David J. Kappos
*Director of the United States Patent and Trademark Office*